(12) United States Patent
Zhu et al.

(10) Patent No.: US 10,923,933 B2
(45) Date of Patent: *Feb. 16, 2021

(54) POWER STATION

(71) Applicant: Nanjing Chervon Industry Co., Ltd., Nanjing (CN)

(72) Inventors: Hong Zhu, Nanjing (CN); Zhihai Teng, Nanjing (CN)

(73) Assignee: Nanjing Chervon Industry Co., Ltd., Nanjing (CN)

(*) Notice: Subject to any disclaimer, the term of this patent is extended or adjusted under 35 U.S.C. 154(b) by 122 days.

This patent is subject to a terminal disclaimer.

(21) Appl. No.: 16/209,529

(22) Filed: Dec. 4, 2018

(65) Prior Publication Data

US 2019/0109478 A1 Apr. 11, 2019

Related U.S. Application Data

(63) Continuation of application No. PCT/CN2017/088367, filed on Jun. 15, 2017, which
(Continued)

(30) Foreign Application Priority Data

Jun. 8, 2016 (CN) .......................... 201610403960.1
Jun. 8, 2016 (CN) .......................... 201610404626.8

(51) Int. Cl.
*H02J 7/00* (2006.01)
*H02J 9/06* (2006.01)
(Continued)

(52) U.S. Cl.
CPC .......... *H02J 7/0063* (2013.01); *H02J 7/0044* (2013.01); *H02J 7/0045* (2013.01); *H02J 7/0072* (2013.01);
(Continued)

(58) Field of Classification Search
CPC ...... H02J 7/0063; H02J 7/0044; H02J 7/0045; H02J 7/0072; H02J 9/062; H02J 7/022;
(Continued)

(56) References Cited

U.S. PATENT DOCUMENTS 5,185,536 A 2/1993 Johnson, Jr. et al.
5,905,356 A 5/1999 Wells
(Continued)

FOREIGN PATENT DOCUMENTS

CN 200980050 Y 11/2007
CN 200983511 Y 11/2007
(Continued)

OTHER PUBLICATIONS

United States Patent and Trademark Office, Office Action issued on U.S. Appl. No. 15/209,306, dated Feb. 1, 2019, 14 pages.
(Continued)

*Primary Examiner* — Zixuan Zhou
(74) *Attorney, Agent, or Firm* — Greenberg Traurig, LLP

(57) ABSTRACT

The present disclosure is provided with a power station including: an inverter for converting a direct current outputted by one or more battery packs into an alternating current; a rectifier for converting an alternating current into a direct current for charging the one or more battery packs; at least one battery pack interface configured to removably receive the one or more battery packs, that is originally used as a power source for a handheld electric power tool or a garden tool. A power system includes the power station, the one or more battery packs and an external electrical device coupled to the power station.

20 Claims, 18 Drawing Sheets

Related U.S. Application Data is a continuation of application No. PCT/CN2017/088366, filed on Jun. 15, 2017.

(51) Int. Cl.
*H02J 7/02* (2016.01)
*H02M 1/10* (2006.01)

(52) U.S. Cl.
CPC .............. *H02J 7/022* (2013.01); *H02J 9/062* (2013.01); *H02J 2007/0067* (2013.01); *H02M 1/10* (2013.01)

(58) Field of Classification Search
CPC .. H02J 2007/0067; H02J 2207/20; H02J 7/02; H02M 1/10
USPC ........................................ 320/103, 128, 137
See application file for complete search history.

(56) References Cited

U.S. PATENT DOCUMENTS

| | | | |
|---|---|---|---|
| 9,315,109 | B2 | 4/2016 | Marathe et al. |
| 10,439,415 | B2 | 10/2019 | Zhu et al. |
| 2006/0108970 | A1 | 5/2006 | Leasure et al. |
| 2007/0247004 | A1 | 10/2007 | Tan et al. |
| 2015/0171632 | A1* | 6/2015 | Fry ........................ H02J 7/0047 307/22 |
| 2016/0099575 | A1* | 4/2016 | Velderman ............ H02J 7/0013 307/72 |

FOREIGN PATENT DOCUMENTS

| | | |
|---|---|---|
| CN | 201038801 Y | 3/2008 |
| CN | 202014108 U | 10/2011 |
| CN | 202405816 U | 8/2012 |
| CN | 102739101 A | 10/2012 |
| CN | 202931014 U | 5/2013 |
| CN | 203278327 U | 11/2013 |
| CN | 204131401 U | 1/2015 |
| CN | 205195359 U | 4/2016 |
| WO | 2013015926 A1 | 1/2013 |
| WO | 2017070645 A1 | 4/2017 |

OTHER PUBLICATIONS

ISA/CN, International Search Report issued on PCT application No. CN2017/088367, dated Sep. 20, 2017, 2 pages.

ISA/CN, International Search Report issued on PCT application No. CN2017/088366, dated Sep. 15, 2017, 2 pages.

United States Patent and Trademark Office, Non-Final Office Action issued on U.S. Appl. No. 16/512,555, dated Oct. 28, 2020, 8 pgs.

\* cited by examiner

POWER STATION

CROSS-REFERENCE TO RELATED APPLICATIONS

This application is a continuation of international application No. PCT/CN2017/088367 filed on Jun. 15, 2017, which claims the benefit and priority of Chinese patent application No. 201610403960.1, entitled "ADAPTER, PORTABLE POWER SYSTEM, AND POWER SYSTEM" filed on Jun. 8, 2016; this application is also a continuation of international application No. PCT/CN2017/088366 filed on Jun. 15, 2017, which claims the benefit and priority of Chinese patent application No. 201610404626.8, entitled "PORTABLE POWER SUPPLY ACCESS APPARATUS AND PORTABLE POWER SUPPLY" filed on Jun. 8, 2016. All applications are incorporated herein in their entirety by reference.

TECHNICAL FIELD

Embodiments of the present invention relate to a power system, and in particular to a power station, and a power system with the power station included therein.

BACKGROUND

With the development of the battery technology, electric tools are gradually replacing engine tools, which use engine to drive the tools. The rated power and capacity of a battery pack for the electric power tools are also required to be increasing in order to achieve the working effect and duration similar to that of the engine tool.

When working and traveling outdoors, AC power supply is often needed to supply power for some equipment. Traditional portable power supply is usually supplied by internal cell group. Once the power of the cell group of the power supply is exhausted, AC power cannot be continuously provided.

SUMMARY

To solve the deficiency of the prior art, the present disclosure aims to provide a power station and a power system which can provide energy to an external electrical device coupled to the power station.

To achieve this object, the present invention adopts the following technical solution:

One embodiment of the present disclosure provides a power station, comprising an adaptor having an electrical energy input interface for receiving electrical energy from a power supply device, the adaptor comprising a housing; an electrical energy storage unit; and an electrical energy output port unit disposed on the housing, the electrical energy output port unit comprising at least one AC output port adapted to output an alternating current; and at least one DC output port adapted to output a direct current; a charging or charging regulator unit configured to couple the electrical energy input interface to the electrical energy storage unit and to charge the electrical energy storage unit with the electrical energy received from the electrical energy input interface; a discharging or discharging regulator unit configured to couple the at least one battery pack to the electrical energy output port unit, the discharge or discharging regulator unit comprising a first AC discharging regulator provided between the at least one battery pack and the at least one AC output port and configured to receive the electrical energy from the electrical energy storage unit and selectively transmit the electrical energy supplied by the electrical energy storage unit to the at least one AC output port; and a second DC discharging regulator provided between the at least one battery pack and the at least one DC output port and configured to receive electrical energy from the electrical energy storage unit and selectively transmit the electrical energy supplied by the electrical energy storage unit to the at least one DC output port; and a control or control circuit unit comprising a charging control module and a discharging control module, wherein the charging control module is coupled to the charging or charging regulator unit for performing charging control of the charging or charging regulator unit; wherein the discharging control module is coupled to the discharging or discharging regulator unit for performing discharging control of the discharging or discharging regulator unit such that the discharging regulator unit coupled to the electrical energy storage unit is configured to selectively transmit discharge power to the at least one AC output port and/or the at least one DC output port; wherein a ratio between a voltage of the electrical energy storage unit and a voltage of the alternating current outputted by the adaptor ranges from 0.07 to 1.5; wherein a ratio between the voltage of the electrical energy storage unit and a voltage of the direct current outputted by the adaptor ranges from 0.5 to 32; wherein a ratio between a total power outputted by the portable power station and a total weight of the portable power station ranges from 20 Wh/kg to 75 Wh/kg; wherein the housing comprising a top wall, a bottom wall and opposite side walls located between the top wall and the bottom wall, the power station comprises two handles attached to the housing, the two handles is configured to extend between the opposite side walls of the housing and respectively located at two sides of the top wall such that the power station becomes a portable device for a user to carry the total weight of the power station by the two handles.

Another embodiment of the present disclosure provides a power station, comprising a housing, an electrical energy input interface, an electrical energy storage unit, an electrical energy output port unit, a charging or charging regulator unit, a discharging or discharging regulator unit and a control or control circuit unit, wherein the electrical energy input interface is configured to receive electrical energy from a power supply device; the charging or charging regulator unit is configured to couple the electrical energy input interface to the electrical energy storage unit and to charge the electrical energy storage unit with electrical energy received from the electrical energy input interface; the discharging or discharging regulator unit is configured to couple the electrical energy storage unit to the electrical energy output port unit and selectively transmit the electrical energy supplied by the electrical energy storage unit to the electrical energy output port unit; the control or control circuit unit comprises a charging control module and a discharging control module, wherein the charging control module is coupled to the charging or charging regulator unit for performing charging control of the charging or charging regulator unit; the discharging control module is coupled to the discharging or discharging regulator unit for performing discharging control of the discharging or discharging regulator unit so that the discharging or discharging regulator unit coupled to the electrical energy storage unit is configured to selectively transmit discharge power to the electrical energy output port unit, wherein the electrical energy output port unit at least comprises a first DC output port and/or a second AC output port; wherein a ratio between a voltage of the electrical energy storage unit and a voltage of a direct current outputted by the first DC output port ranges from 0.5 to 32; wherein a ratio between a voltage of the electrical energy storage unit and a voltage of an alternating current outputted by the second AC output port ranges from 0.07 to 1.5; wherein the housing comprising a top wall, a bottom wall and opposite side walls located between the top wall and the bottom wall, the power station comprises two handles attached to the housing, the two handles is configured to extend between the opposite side walls of the housing and respectively located at two sides of the top wall such that the power station becomes a portable device for a user to carry a total weight of the power station by the two handles.

Another embodiment of the present disclosure provides a power system with a power station, the power station comprising a housing, an electrical energy input interface, an electrical energy storage unit, an electrical energy output port unit, a charging or charging regulator unit, a discharging or discharging regulator unit and a control or control circuit unit, wherein the electrical energy input interface is configured to receive an electrical energy from a power supply device; the charging or charging regulator unit is configured to couple the electrical energy input interface to the electrical energy storage unit and to charge the electrical energy storage unit with the electrical energy received from the electrical energy input interface; the discharging or discharging regulator unit is configured to couple the electrical energy storage unit to the electrical energy output port unit and configured to receive electrical energy from the electrical energy storage unit and selectively transmit the electrical energy storage unit to the electrical energy output port unit; the control or control circuit unit comprises a charging control module and a discharging control module, wherein the charging control module is coupled to the charging or charging regulator unit for performing charging control of the charging or charging regulator unit; wherein the discharging control module is coupled to the discharging or discharging regulator unit for performing discharging control of the discharging or discharging regulator unit so that the discharging or discharging regulator unit coupled to the electrical energy storage unit is configured to selectively transmit discharge power to the electrical energy output port unit; wherein a ratio between a total power outputted by the portable power station and a total weight of the portable power station ranges from 20 Wh/kg to 75 Wh/kg; wherein the housing comprising a top wall, a bottom wall and opposite side walls located between the top wall and the bottom wall, the portable power station comprises two handles attached to the housing, the two handles is configured to extend between the opposite side walls of the housing and respectively located at two sides of the top wall such that the power station becomes a portable device for a user to carry the total weight of the power station by the two handles.

One advantage of the present invention may lie in that the power station can either be charged or discharged, and can become a portable device for a user to carry.

DETAILED DESCRIPTION

Hereinafter, embodiments of the present invention will be described in detail in combination with the accompanying drawings and the specific embodiments.

Figure 1:
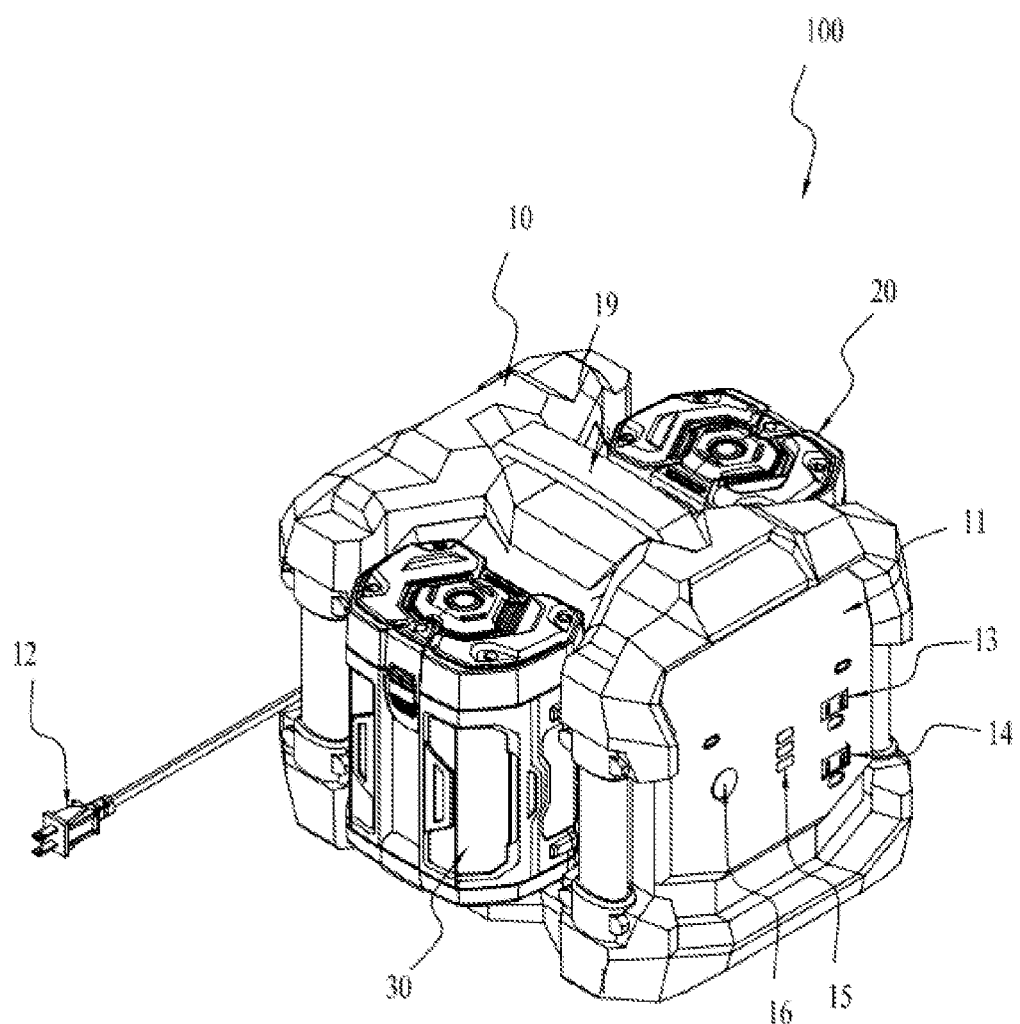
FIG. 1 is a schematic perspective view of an exemplary electrical energy system.

A portable electric energy device or system 100 includes an adaptor 10 and one or more battery packs 20, 30. Two battery packs 20, 30 are shown in FIG. 1.

The battery packs 20 and 30 may be identical, or may be different. Each of them may supply power to a DC (direct current) electric tool.

Figure 5:
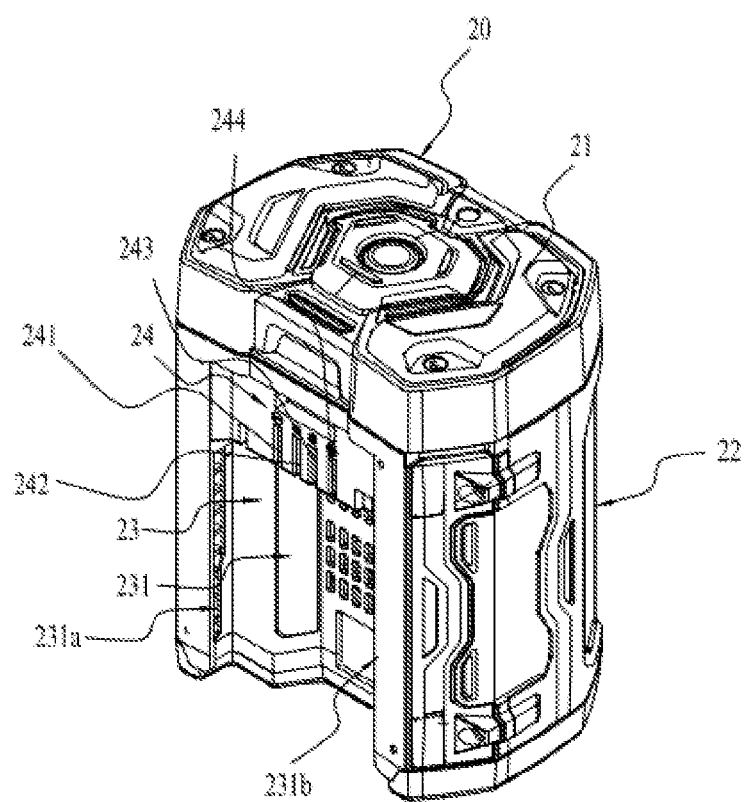
FIG. 5 is a schematic perspective view of a battery pack in the portable electrical energy system as shown in FIG. 1.

Specifically, as shown in FIG. 5, the battery pack 20 includes cells 21 and a first housing 22. The cells 21 are accommodated in the first housing 22.

The cells 21 are configured to store energy and may be charged and discharged repeatedly. The cell 21 may be a lithium-ion battery. The first housing 22 is configured to accommodate the cells 21 and other components of the battery pack 20, and the first housing 22 has a joint or coupling portion 23, by which the battery pack 20 may be removably coupled to a battery interface of an electric tool.

The battery pack 20 further includes a plurality of connection terminals, which are configured to electrically connect the cells 21 to an external circuit, such as that is the circuit for driving a motor in the electric tool or a charging unit in a charger.

The battery pack 20 may include other types of connection terminals, such as a communication terminal for communication and configured to achieve a signal interaction.

In addition, the battery pack 20 may further include a circuit board, a controller and some kinds of detectors. The circuit board may be configured to build circuits into the battery pack 20. The controller may be configured to perform the control for the battery pack 20. The detectors may be configured to detect some electrical parameters and/or physical parameters of the battery pack 20, such as the current, voltage or temperature inside the battery pack 20. Specifically, the circuit including the circuit board, the controller and the detectors built inside the battery pack enables the battery pack 20 with the functions of over-discharging protection and/or over-charging protection to avoid the over-discharging or over-charging problems, and allows the battery pack 20 to communicate with other external devices in a wired or wireless manner. In some alternative embodiments, the battery packs 20, 30 may be other electrical energy storage units, which can be arranged inside or outside the portable power station. If the battery packs 20, 30 are provided outside the portable power station, they may be detachably or removably coupled to the portable power station.

Specifically, the rated voltage of the battery pack 20 may be greater than or equal to 30 V and less than or equal to 350 V. More specifically, the range of the rated voltage of the battery pack 20 may be 30 V to 50 V, 50 V to 85 V, 85 V to 100 V, 100 V to 200 V, or 200 V to 350 V.

The weight of the battery pack 20 may be greater than or equal to 1 kg and less than or equal to 10 kg. More specifically, the range of the weight of the battery pack 20 may range from 1 kg to 2 kg, 2 kg to 2.5 kg, 2.5 kg to 3 kg, 3 k to 4 kg, 4 kg to 5 kg, 5 kg to 6 kg, 6 kg to 7 kg, 7 kg to 8 kg, 8 kg to 9 kg, or 9 kg to 10 kg.

The electric quantity or capacity of the battery pack 20 is greater than or equal to 100 Wh and less than or equal to 2000 Wh. Specifically, the range of the electric quantity or capacity of the battery pack 20 may range from 100 Wh to 150 Wh, 150 Wh to 200 Wh, 200 Wh to 250 Wh, 250 Wh to 300 Wh, 300 Wh to 400 Wh, 400 Wh to 450 Wh, 450 Wh to 500 Wh, 500 Wh to 600 Wh, 600 Wh to 700 Wh, 700 Wh to 800 Wh, 800 Wh to 900 Wh, 900 Wh to 1000 Wh, 1000 Wh to 1100 Wh, 1100 Wh to 1200 Wh, 1200 Wh to 1300 Wh, 1300 Wh to 1400 Wh, 1400 Wh to 1500 Wh, 1500 Wh to 1600 Wh, 1600 Wh to 1700 Wh, 1700 Wh to 1800 Wh, 1800 Wh to 1900 Wh, or 1900 Wh to 2000 Wh.

The adaptor 10 may be connected to the two battery packs 20 30, so that the electric energy device can discharge power from the removable battery packs or charge the battery packs through the adaptor 10. The battery packs 20 and 30 may be separately coupled to the adaptor 10, or have an integrated connection to the adaptor 10.

The adaptor 10 include a second housing 11, which may be formed with a battery pack receptacle or interface to be engaged with the joint or coupling portion 23 of the battery pack 20 so that the battery pack 20 can be detachably or removably coupled to the adaptor 10. In FIG. 1, the power station or electric energy device include a housing, a control circuit or control circuit unit for controlling charging and discharging, a receptacle, a removable power module configured to be received in the receptacle, and an electrical energy or power output port unit including one or more output ports adapted to be coupled to one or more external electrical devices, such as a handheld power tool, a garden tool of FIG. 14 and/or a vehicle of FIG. 16, and wherein the control circuit or control circuit unit is configured to discharge power from the removable power module into the one or more external electrical devices, such as a handheld power tool, a garden tool of FIG. 14 and/or a vehicle of FIG. 16, to be described later. Herein, the control circuit for controlling charging and discharging is included within the power station. In an embodiment, the control circuit or control circuit unit may include a charging control module and a discharging control module, and the charging control module may be included within the removable battery pack or power module and the discharging control module may be included in the adaptor or power station. Alternatively, a part of the control circuit or control circuit unit may be set in the removable battery pack or power module, and another part of the control circuit or control circuit unit may be set in the adaptor or power station to achieve the charging and discharging between the removable battery pack or power module and the power station, or between the power station and the external electrical device. A power system, also referred to as a battery-based power system, includes the power station, the one or more battery packs or the power module, and an external electrical device coupled to the power station, wherein the external electrical device may be a handheld power tool, a garden tool of FIG. 14 or a vehicle of FIG. 16.

The adaptor 10 also includes an inverter and a rectifier. The inverter may convert a direct current outputted or discharged by the battery packs coupled to the adaptor 10 into an alternating current; the rectifier may convert an alternating current supplied by the adaptor 10 into a direct current for charging the battery packs through the adaptor 10. The inverter and the rectifier may be embedded in circuit boards and circuit elements. The circuit boards and the circuit elements that include the inverter and the rectifier may be accommodated within a chamber defined by the second housing 11.

The adaptor 10 may include one or more AC (alternating current) input ports, which allow the adaptor 10 to receive an alternating current from a power grid. Specifically, the AC input port may be formed as a power source plug 12 as show in FIG. 1 so as to ensure safe use of electricity, or may be formed as a general AC port or interface (the interface may be formed as that is similar to a power source plug 13), so that it is convenient for the user to select different power source lines with different lengths for couple to an external connector from a power grid.

The adaptor 10 may charge the one or more battery packs by the alternating current that may be received or supplied from the power grid. In an example, the AC input port is electrically coupled to the rectifier, and the alternating current from the AC input port may be converted by the rectifier into the direct current, which can charge the battery pack.

The adaptor 10 includes an electric energy output port unit which may include an AC output port unit and a DC output port unit. The AC output port unit includes one or more AC output ports, which may be adapted to output an alternating current so that the power station or system 100 may serve as an AC power source. In an example, the power source or the electrical energy of the one or more AC output ports may be that is stored in the one or more battery packs coupled to the adaptor 10 or the portable electric energy device, or that is supplied or received by the adaptor 10 from the power grid through the AC input port. The AC output port may be formed as the power source sockets 13, 14 as shown in FIG. 1. The power source sockets 13, 14 may be designed to have the same specifications as the sockets of a local power grid, so that the power station system 100 may be applicable for the local AC electric devices. The power source sockets 13, 14 may be provided at the same side or different sides of the adaptor 10.

The adaptor 10 may use the electrical energy from the one or more battery packs coupled to the adaptor 10 to output an alternating current by the one or more AC output ports. In an example, the AC output port may be electrically coupled to the inverter. A direct current from the one or more battery packs may be converted by the inverter into an alternating current, which can be outputted to the AC output port.

In an example, the output voltage of the AC output port may be equal to the input voltage of the AC input port.

The DC output port unit includes one or more DC output ports, by which the adaptor 10 may output the direct current. Specifically, the DC output port may be configured as a 5V USB port 15, or as a 12V vehicle power source port 16 as shown in FIG. 1. Of course, the one or more DC output port may also be configured as other forms for outputting other different voltage values, such as 19 V, 36 V or the like. Alternatively, the output voltage of the one or more DC output ports may be lower than the rated or input voltage of the one or more battery packs. When there is a plurality of DC output ports, it is designed that one of the DC output ports may have a voltage lower than that of any other DC output ports.

In an embodiment, the electrical energy system 100 may further include another transfer device, with a first port at one end of the transfer device designed to match with the DC output port of the adaptor 10, and a second port at the other end of the transfer device designed to be in the form of a false battery pack, which has no battery cells in the false battery pack. As such, a DC power tool using the battery pack can obtain a DC power source from the adaptor 10 or electrical energy system 100 via the transfer device with the false battery pack, which has the same form of the real battery pack coupled to the DC power tool.

Figure 15:
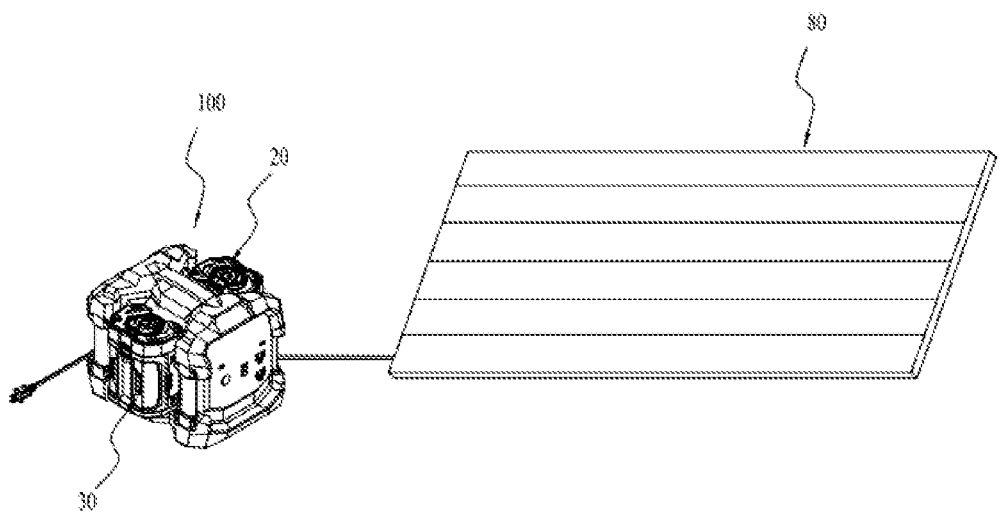
FIG. 15 shows a combination of the portable electrical energy system and a photovoltaic plate.
Figure 16:
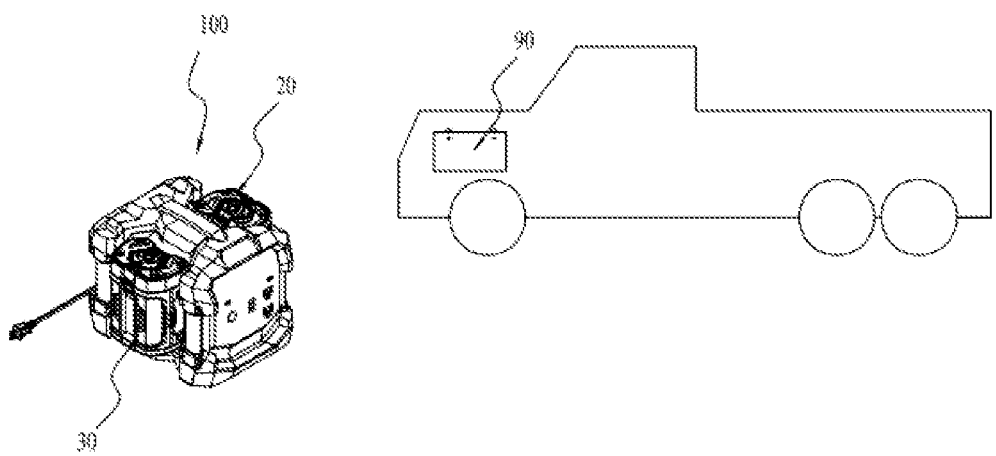
FIG. 16 shows a combination of a vehicle storage battery and an adaptor.

In an embodiment, the adaptor 10 may include a DC input port configured to allow the adaptor 10 to receive a direct current. The direct current received by the adaptor 10 from some devices other than the battery pack can also charge the one or more battery packs, and/or charge any other electric devices coupled to the electrical energy system 100. As shown in FIG. 15, the direct current that is supplied by a photovoltaic panel 80 for receipt of the solar energy may be inputted into the adaptor 10 via the DC input port to charge the battery pack coupled to the adaptor 10. As shown in FIG. 16, a vehicle includes a motor and a storage battery 90, which may be coupled to the adaptor 10 via the DC input port. The vehicle is electrically coupled to the power station, the vehicle battery 90 can also charge the one or more battery packs 20, 30 or power module of the adaptor 10. Alternatively, the control or control circuit unit is configured to have the vehicle battery charge the one or more battery packs 20, 30 or the power module, or the power module charge the vehicle battery 90. In addition, the user may use the vehicle engine to obtain the electrical energy so as to charge the storage battery 90 of the vehicle. Thus, as the vehicle has fuel, the one or more battery packs of the adaptor 10 or electrical energy system 100 can be charged by the vehicle engine or the vehicle storage battery 90. Otherwise, the adaptor 10 or the electric energy device 100 may discharge power from the removable battery packs, power module, or energy storage unit into the vehicle via the one or more DC output port of the adaptor 10. That is to say, the storage battery 90 of the vehicle may be charged by the electric energy device 100 or the adaptor 10 so as to cope with the situation the vehicle cannot be started when the storage battery 90 depleted. Or the control circuit is configured to have the battery pack or power module provides energy to the vehicle battery or the vehicle. The vehicle can be also named as an electric wheeled apparatus, which may include a mower vehicle of the power tool field.

The DC input port may be formed as the USB port 15 as shown in FIG. 1 or a 12V port.

In an alternative embodiment, the power station or system 100 may include a plurality of battery packs which may have the same or different rated voltages. The adaptor 10 may be configured to enable one of the battery packs with a higher voltage or/and capacity to charge another one of the battery packs with a lower voltage or/and capacity. Of course, the adaptor 10 may use its internal circuits to enable the battery pack of a lower voltage or/and capacity to be charged by the battery pack of a higher voltage or/and capacity.

When the adaptor 10 uses the one of battery packs with a higher voltage or/and capacity to charge another one of the battery packs with a lower voltage or/and capacity, the port coupled to another one of the battery packs may be used as a DC input port.

In an alternative embodiment, the adaptor 10 may include a wireless discharging device, which may have a discharging coil and a wireless discharging circuit unit therein. The wireless discharging circuit unit may allow a current to flow through the discharging coil so as to produce a magnetic field. The electric device to be charged may accept the electric energy by thereof a charging coil, which corresponds to the discharging coil, or an adaptor with the charging coil, wherein the magnetic field produced on the discharging coil enables the charging coil of the electric device to generate the current to achieve the transmission of the electric energy from the adaptor 10 to the electric device. Thus, the adaptor 10 coupled to the one or more battery packs may wirelessly discharge power from the one or more battery packs into the electric device and can be used as a power source for the electric device, which may be a vehicle. The wireless discharging device may be powered by an AC power source coupled to the adaptor 10 or electric energy device 100, or by the direct current supplied by the one or more battery packs coupled to the adaptor 10.

In an alternative embodiment, the adaptor 10 further includes a wireless communication unit which may be configured to enable the adaptor 10 to be in a wireless communication with the battery packs, other adaptors and/or other wireless communication unit. The wireless communication unit may be a wireless router in a local area network, which can access to the internet, to enable the other wireless communication unit of the local area network to access the internet by the wireless router, or enable the other wireless communication units of the local area network to access the internet by another wireless communication unit, which communicates with the wireless router and accesses to the internet. Of course, the wireless communication unit of the adaptor 10 may do data interaction between wireless communication units of the local area network. The wireless communication unit may use Bluetooth, WiFi, NFC, ZigBee or the other means to achieve the wireless communication.

As described above, the adaptor 10 or the electric energy device 100 may be power station for charging the one or more battery packs coupled to the adaptor 10, or be a power station for discharging power from the one or more battery packs or power module to the external electrical device, which may include a handheld power tool, a garden tool or the other apparatus of the electric tool field including a vehicle with wheels, or a conversion device adapted to output the alternating current by the electric energy stored in the one or more battery packs. The battery packs coupled to the adaptor 10 may be identical or different. When the adaptor 10 is used as a charger, it may output different charging voltages for the different battery packs. When the adaptor 10 is used as a conversion device, it may also enable the different battery packs to be discharged simultaneously so as to output the direct current or electric energy, which is converted into an alternating current by the conversion device.

In an embodiment, a ratio between the total capacity or power of the battery packs to which the adaptor 10 may couple and the total weight of the portable the electric energy device 100 ranges from 7 Wh/kg to 200 Wh/kg.

In some embodiments, the ratio between the total capacity or power of all the battery packs to which the adaptor 10 may couple and the total weight of the portable electric energy device 100 ranges from 7 Wh/kg to 20 Wh/kg, 21 Wh/kg to 40 Wh/kg, 41 Wh/kg to 60 Wh/kg, 60 Wh/kg to 80 Wh/kg, 80 Wh/kg to 100 Wh/kg, 100 Wh/kg to 120 Wh/kg, 120 Wh/kg to 140 Wh/kg, 140 Wh/kg to 160 Wh/kg, 160 Wh/kg to 180 Wh/kg, or 180 Wh/kg to 200 Wh/kg.

In alternative embodiments, the ratio between the total capacity or power of the battery packs to which the adaptor 10 may couple and the total weight of the portable electric energy system 100 ranges from 7 Wh/kg to 10 Wh/kg, 15 Wh/kg to 20 Wh/kg, 20 Wh/kg to 30 Wh/kg, 30 Wh/kg to 40 Wh/kg, 40 Wh/kg to 55 Wh/kg, 55 Wh/kg to 60 Wh/kg, 60 Wh/kg to 70 Wh/kg, 70 Wh/kg to 75 Wh/kg, 75 Wh/kg to 80 Wh/kg, 80 Wh/kg to 90 Wh/kg, 90 Wh/kg to 100 Wh/kg, 100 Wh/kg to 106 Wh/kg, 20 Wh/kg to 75 Wh/kg, 30 Wh/kg to 70 Wh/kg, 20 Wh/kg to 100 Wh/kg.

The ratio between the total weight of the battery packs to which the adaptor 10 may couple and the total weight of the portable electric energy device ranges from 0.15 to 0.90.

In some embodiments, the ratio between the total weight of the battery packs to which the adaptor 10 may couple and the total weight of the portable electric energy device ranges from 0.15 to 0.20, 0.20 to 0.25, 0.25 to 0.30, 0.30 to 0.35, 0.35 to 0.40, 0.40 to 0.45, 0.45 to 0.50, 0.50 to 0.55, 0.55 to 0.60, 0.60 to 0.65, 0.65 to 0.70, 0.70 to 0.75, 0.75 to 0.80, 0.80 to 0.85, or 0.85 to 0.90.

In alternative embodiments, the ratio between the total weight of the battery packs to which the adaptor 10 may couple and the total weight of the portable electric energy device ranges from 0.18 to 0.70, 0.18 to 0.30, 0.30 to 0.40, 0.40 to 0.50, 0.50 to 0.70, 0.20 to 0.70, 0.30 to 0.60, 0.40 to 0.50, or 0.50 to 0.70.

The ratio between the voltage of the one or more battery packs or the electrical energy storage unit, and the voltage of the alternating current outputted by the adaptor 10 ranges from 0.07 to 1.5.

In some embodiments, the ratio between the voltage of the one or more battery packs or the electrical energy storage unit, and the voltage of the alternating current outputted by the adaptor 10 ranges from 0.16 to 1.5, 0.07 to 0.10, 0.10 to 0.20, 0.20 to 0.30, 0.30 to 0.40, 0.50 to 0.60, 0.70 to 0.80, 0.80 to 0.90, 0.90 to 1.00, 1.00 to 1.10, 1.10 to 1.20, 1.20 to 1.30, 1.30 to 1.40, or 1.40 to 1.50.

The ratio between the voltage of the one or more battery packs or the electrical energy storage unit, and the voltage of the direct current outputted by the adaptor 10 ranges from 0.5 to 32.

In some embodiments, the ratio between the voltage of the one or more battery packs or the electrical energy storage unit, and the voltage of the direct current outputted by the adaptor 10 ranges from 0.5 to 8.2, 3.6 to 31.2, or 1.5 to 13.

In alternative embodiments, the ratio between the voltage of the one or more battery packs or the electrical energy storage unit, and the voltage of the direct current outputted by the adaptor 10 ranges from 0.5 to 1, 1 to 3, 3 to 4, 4 to 5, 5 to 8, 8 to 9, 9 to 11, 11 to 12, 12 to 14, 14 to 17, 17 to 19, 19 to 20, 20 to 25, 25 to 30, or 30 to 32.

Figure 3:
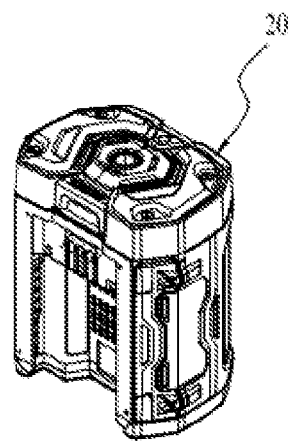
FIG. 3 is a schematic perspective view of the portable electrical energy system as shown in FIG. 1 with battery packs being removed.
Figure 3:
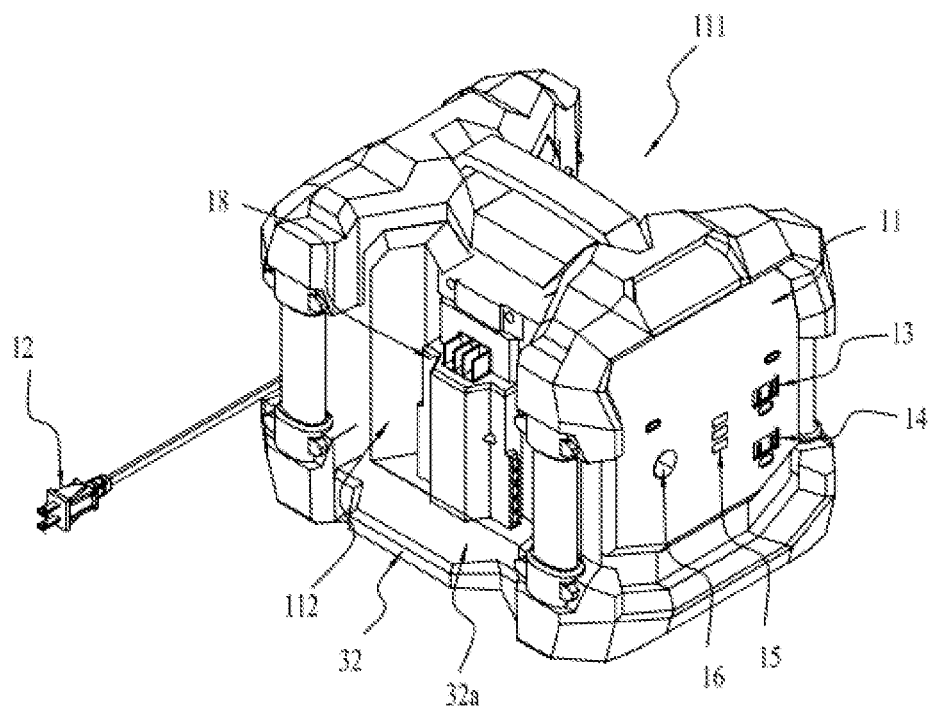
Figure 4:
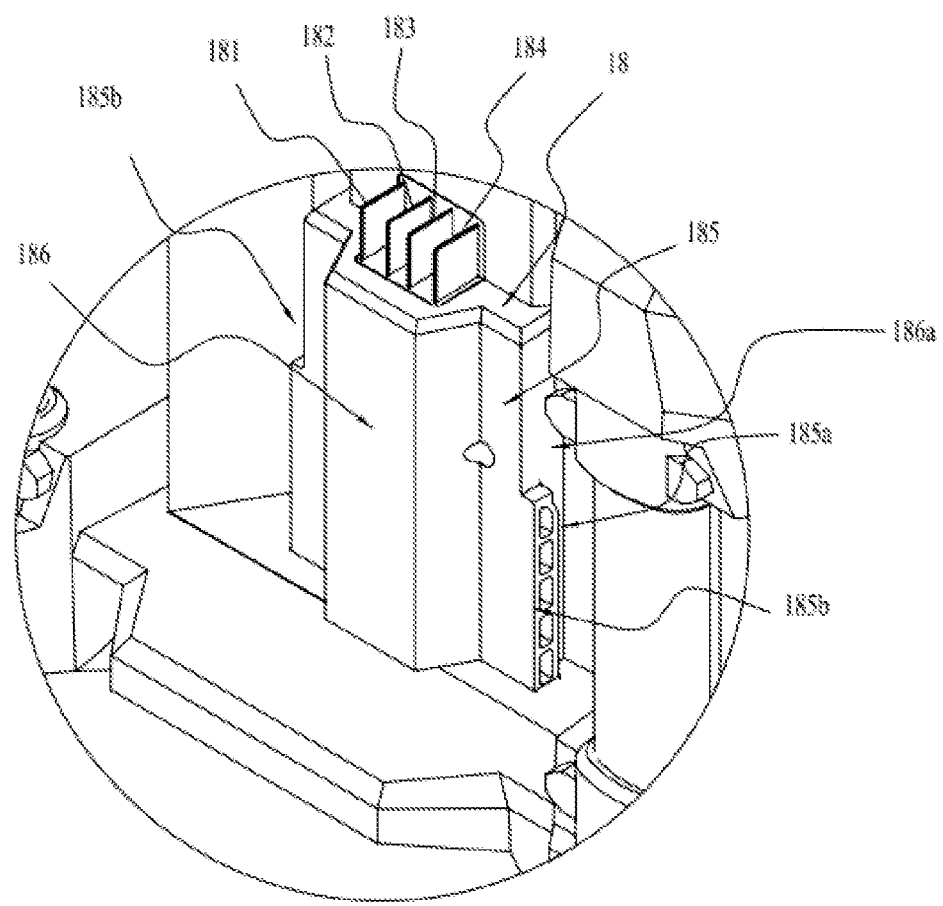
FIG. 4 is a schematic enlarged view of a partial structure as shown in FIG. 3.

As shown in FIGS. 3 to 5, the adaptor 10 includes one or more battery pack interfaces 17,18.

As shown in FIGS. 4 and 5, the battery pack interface 18 includes a plurality of electrical connection terminals 181, 182, 183 and 184, which are suitable for engagement with terminals in the battery pack respectively, so as to achieve an electrical connection between the adaptor 10 and the battery pack to transmit electrical energy or signal therebetween. Specifically, the electrical connection terminals 181, 184 of the adaptor 10 are to be engaged with the positive and negative terminals of the battery pack, which is therefore coupled to a circuit in an inverter or a rectifier of the adaptor 10.

The battery pack interfaces 18 of the adaptor 10 further includes a coupling structure 185, which enables the battery pack to be removably coupled to the adaptor. Specifically, the coupling structure 185 may include two guiding rails 185a and 185b, which guide the battery pack 30 to be slidably and removably coupled to the adaptor 10. The guiding rails 185a and 185b are respectively formed at two sides of a protrusion 186, which protrudes upwards with respect to a periphery of the battery pack interface 18, and the electrical connection terminals 181, 182, 183 and 184 are disposed on the top of the protrusion 186. The protrusion 186 includes two portions i.e., a rail portion 186a and a protruding portion 186b, which are arranged at the front and rear sides respectively. The guiding rails 185a and 185b are formed at the left and right sides of the rail portion 186a respectively, and the protruding portion 186b further protrudes forward from the rail portion 186a.

Due to the battery pack 30 similar to the battery pack 20, the structure of the battery pack 30 to be matched with the guiding rails 185a and 185b may refer to the corresponding structure of the battery pack 20, which will be described hereinafter.

As shown in FIG. 5, the joint or coupling portion 23 of the battery pack 20 forms as a recess 231, which may be engaged or matched with the protrusion 186. The recess 231 has an electrical connector or port 24 of the battery pack 20 disposed thereon. The electrical connector or port 24 includes terminal ports 241, 242, 243 and 244. The connection terminals of the adaptor 10 may be electrically coupled to the terminals of the battery pack 20 by plugging into the corresponding terminal ports 241, 242, 243 and 244. Guiding structures 231a and 231b to be cooperated with the guiding rails 185a and 185b are disposed at two sides of the recess 231 respectively.

The battery packs 20 or 30 may be inserted or plugged into the adaptor 10 along a vertical direction in FIG. 4. The cooperation of the guiding rails and the guiding structures, and the protrusion and the recess can limit the movement of the battery pack relative to the adaptor 10 in the front, rear, left and right directions. Therefore, the adaptor 10 may have a limiting structure to limit the movement of battery pack relative to the adaptor 10 in the longitudinal direction to enable the battery pack and the adaptor to be coupled together when the battery pack is to be inserted or plugged into the adaptor 10. The adaptor 10 may form a stop surface located adjacent to the bottom of the battery pack to obstruct the battery pack to be moved more downwardly along the insertion direction. Meanwhile, the adaptor 10 may be provided with a movable hook to lock the battery pack, when the battery pack is inserted or plugged into a predetermined position, at the predetermined position, so that the battery pack cannot be pulled out in a direction opposite to the insertion direction.

In an alternative embodiment, the adaptor may be formed with a structure similar to the recess 231, and the battery pack may be formed with a structure similar to the protrusion 186. As such, the dimension of the adaptor may be increased.

Figure 2:
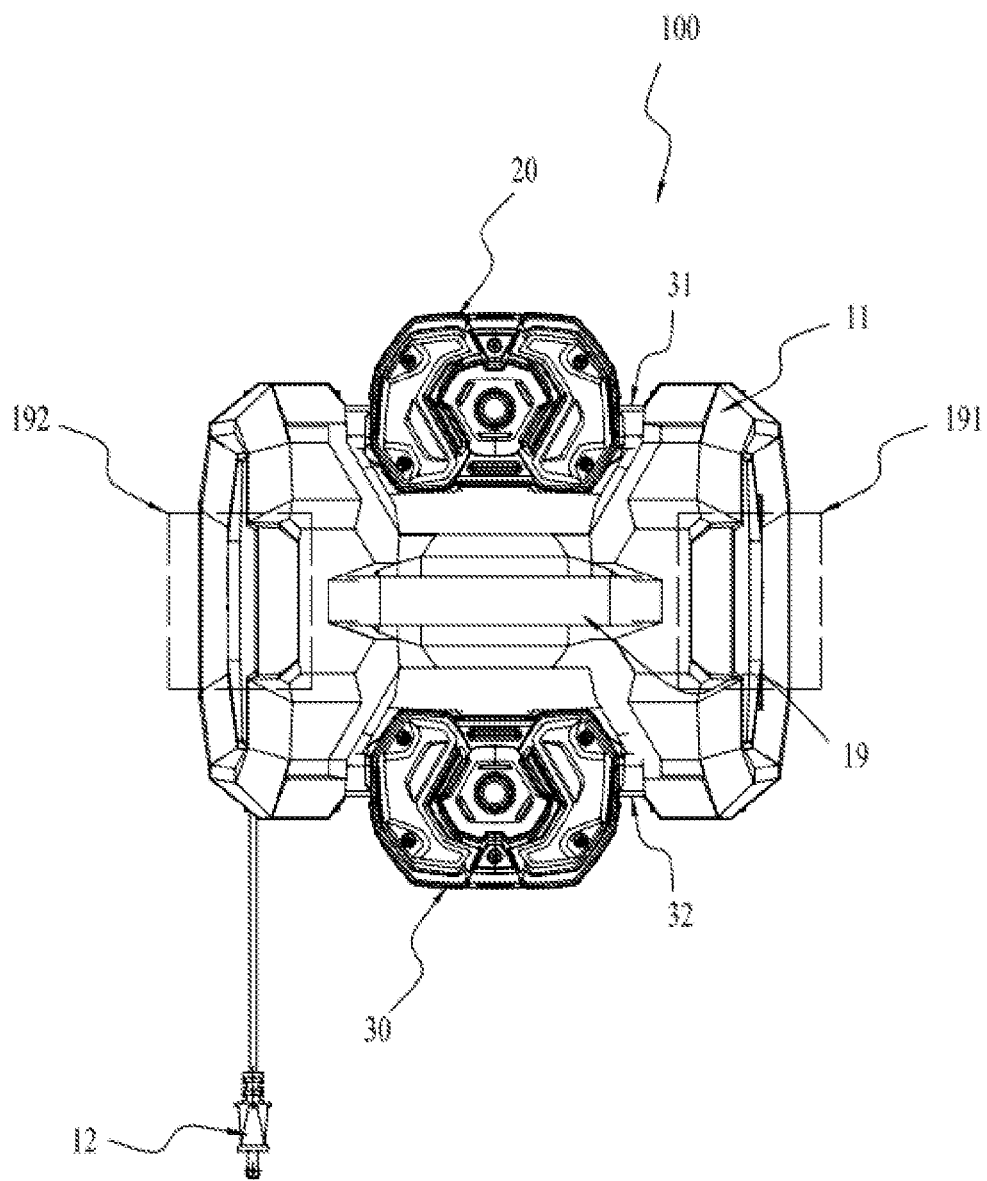
FIG. 2 is a top view of the portable electrical energy system as shown in FIG. 1.

The adaptor 10 comprises a housing, and at least one battery pack interface or receptacle 18 disposed on the housing and configured to removably receive the at least one battery pack 30. The at least one battery pack 30 is not shown in FIG. 3 in order to show the battery pack interface 18, reference may be made to the battery pack 30 as shown in FIGS. 1 and 2. Herein, the one or more battery packs are originally used as a power source of a handheld electric power tool or a garden device including a garden tool, a mower vehicle and etc so as to enable the one or more battery packs to be universal for the electric tool field including a vehicle such as a mower.

It is advantageous that circuit boards and electronic elements which are connected with the electrical connection terminals of the battery pack interfaces 17 and 18 may be arranged between the battery pack interfaces 17 and 18 so as to facilitate wiring and heat dissipation.

Of course, the battery pack interfaces may be arranged at two opposite sides, such as upper and lower sides, left and right sides relative to another element, or at two sides along another direction. When there are much more battery packs, it is possible to arrange the multiple battery pack interfaces at one side, or to arrange battery pack interfaces at the upper, lower, left, right, front and rear sides.

In this disclosure, the terms "upper", "lower", "left", "right", "front" and "rear" are the relative positions for facilitating describing the solutions, rather than absolute positions. In practice, the absolute positions may change at different situations, and thus the terms "upper", "lower", "left", "right", "front" and "rear" should not limit the scope of the above described solutions.

As shown in FIGS. 1 to 4, the battery pack interfaces 17 and 18 are located at the front side or rear side of the second housing 11. The second housing 11 is respectively formed with two receiving recesses or receptacles 111, 112 at the front and rear sides of the second housing 11. The receiving recess 112 is formed at the front side of the second housing 11 and is depressed towards the rear side of the second housing 11, and the receiving recess 111 is formed at the rear side of the second housing 11 and is depressed towards a direction opposite to the depressing direction of the receiving recess 112. The battery pack interface 18 is provided in the receiving recess or receptacle 112 formed at the front side of the second housing 11, and the battery pack interface 17 is provided in the receiving recess or receptacle 111 formed at the rear side of the second housing 11.

As shown in FIG. 4, the battery pack or removable power module 30 is configured to be received in the receiving recess or receptacle 112 when removably coupled to the battery pack interface 18. Similarly, the battery pack 20 is also configured to be received in the receiving recess or receptacle 111 when it is removably coupled to the battery pack interface 17.

It is advantageous that when the battery pack is coupled to the adaptor 10 by the above receptacles or battery pack interface, since the receptacle of the second housing can accommodate a part of the battery pack so that the overall dimension of the battery pack together with the adaptor will be reduced especially when the battery pack is large. In addition, the adaptor may be required to have enough inner space to accommodate circuit boards and electronic elements so as to facilitate the heat dissipation thereof during operation. The design of receiving recess or receptacle can ensure the adaptor to have enough inner space with the reduced overall dimension of the battery packs and the adaptor. Further, the receiving recess or receptacle may protect the battery pack from the left and right sides so as to prevent the battery pack from being shocked and damaged in some situation of accidental impact and destruction.

As shown in FIGS. 1 to 3, the adaptor 10 further includes a handle 19 for a user to grip. The handle 19 is provided between the two battery pack interfaces 17 and 18, configured to extend substantially along the left and right directions in FIG. 2. The total weight of the adaptor 10 is arranged such that the adaptor 10 with the two battery packs thereon is balanced relative to the handle 19 when the two battery packs are coupled to the battery pack interfaces 17, 18, and the adaptor 10 with no battery pack thereon is also balanced relative to the handle 19 after the battery pack is removed from the adaptor 10.

In an embodiment of FIG. 2, i.e. in a reference plane that is perpendicular to a vertical or longitudinal direction, a projection of the gravity center G1 of the adaptor 10 with no battery packs thereon falls into a projection of the handle 19 that is projected in the reference plane.

In the embodiment of FIG. 2, a projection of the gravity center G2 of a combination of the adaptor 10 and the battery packs falls into a projection of the handle 19 that is projected in the reference plane.

In addition, due to the demand for high power supply, the entire electric energy device 100 including the adaptor 10 and the one or more battery packs is too heavy, and the user may need to carry the entire electric energy device 10 by two hands. In an alternative embodiment, the adaptor 10 may have more than two handles for the user. The two handles may be provided adjacent to the position defined by two dash-line boxes 191 and 192 in FIG. 2. It can be seen from FIG. 2 that the battery pack interfaces 17 and 18 are located between the two handles. If the two handles are far apart from each other, the battery packs may also be located between the two handles. Further, the housing includes a top wall, a bottom wall and opposite side walls located between the top wall and the bottom wall, the power station comprises two handles attached to the housing, the two handles is configured to extend between the opposite side walls of the housing and respectively located at two sides of the top wall such that the power station becomes a portable device for a user to carry a total weight of the power station by the two handles.

Figure 18:
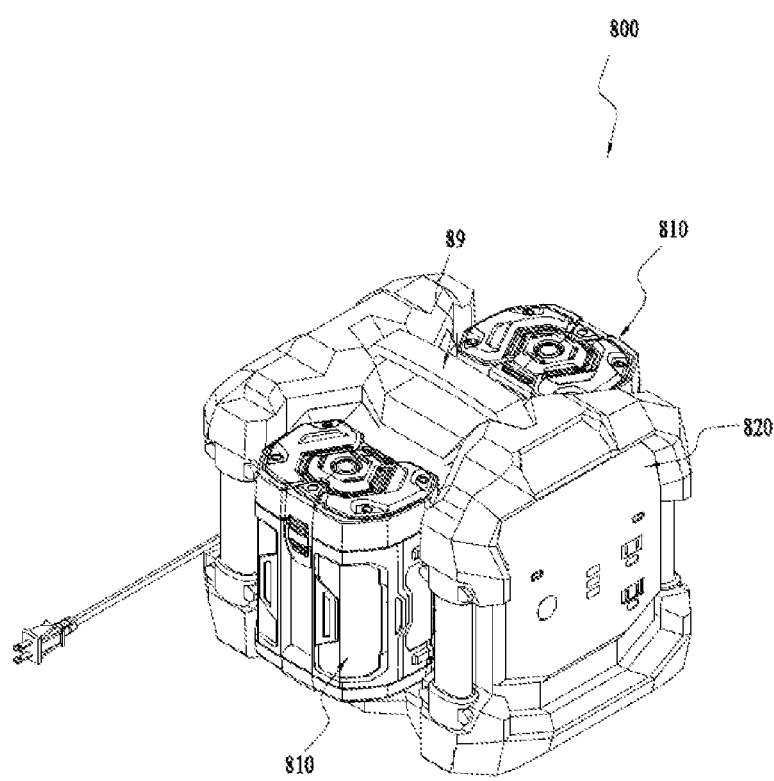
FIG. 18 shows a structure diagram of another exemplary portable electrical energy system.

In an embodiment of FIG. 18, a portable power station or system 800 includes an adaptor 820 and one or more battery packs 810 removably coupled to the adaptor 820. There are two handles 89 for the adaptor 820, and the battery packs 810 are located between the two handles 89. This design does it convenient for users to carry the portable power station 800.

As shown in FIGS. 1 to 4, the adaptor 10 includes supporting seats 31, 32. The supporting seat 32 is configured to support the battery pack 30 when the battery pack 30 is coupled to the battery pack interface 18. The supporting seat 32 at least includes a supporting portion 32a configured to extend beyond the connection structure 185. When the battery pack 30 is coupled to the battery pack interface 18, the center of gravity of the battery pack 30 is located above the supporting portion 32a. Further, the center of gravity of the battery pack 30 is located outside of the connection structure 185 and also above the supporting portion 32a. The supporting seat 32 is configured to be matched with the battery pack interface 18, and the supporting seat 31 is configured to be matched with the battery pack interface 17. A plurality of battery pack interfaces is set to have the supporting seats 32 so as to support the corresponding battery packs. Meanwhile, the supporting seats are also set to be matched with the receiving recesses or receptacles respectively. In other words, the receiving recess or receptacle is set to have a corresponding supporting seat. The connection structure is designed to connect the first housing with the second housing.

As shown in FIGS. 1 to 5, the second housing 11 is provided with a receiving recess or receptacle 112. The supporting seat 32 is formed at the bottom of the receiving recess 112 and configured to protrude outwardly from the receiving recess 112. The supporting seat 32 is at least partially located below the battery pack interface 18 and configured to protrude from the battery pack interface 18 in a direction opposite to the direction along which the receiving recess 112 is depressed.

The handle 19 and the supporting seat 32 are set to be at two opposite sides of the battery pack interface 18 respectively.

As shown in FIGS. 1 to 5, the guiding rails 185a and 185b are configured to enable the battery pack 30 to be slidably coupled to the adaptor 10. Furthermore, the guiding rails 185a and 185b are configured to slidably couple the battery pack 30 to the adaptor 10 along an direction the receiving recess 112 extends.

The adaptor 10 defines a vertical middle plane so that the couples of the battery pack interfaces are arranged symmetrically with respect to the vertical middle plane. For example, the battery pack interface 17 and the battery pack interface 18 are symmetrical in relation to the vertical middle plane. Further, the guiding rails 185a and 185b are configured to slidably couple the battery pack 30 to the adaptor 10 along a direction of the vertical middle plane.

As shown in FIGS. 7 to 13, an adaptor 40 includes a second housing 41, an inverter and a rectifier. The second housing 41 is detachably couples the battery packs 20, 30 to the adaptor 40. The second housing 41 is set to accommodate the inverter and/or the rectifier.

The inverter may change the direct current outputted by the battery pack coupled to the adaptor 40 into the alternating current, and the rectifier may change the alternating current supplied by the adaptor 40 into the direct current, which can charge the battery pack. The inverter and the rectifier may comprise therein circuit boards and circuit elements, all of which are accommodated in a chamber defined by the second housing 41.

The adaptor 40 may include battery pack interfaces 47, 48 and a fan 401. The battery pack interfaces 47, 48 are arranged to couple the removable battery packs 20 and 30 to the adaptor 40. The fan 401 generates an air flow to cool the components of the adaptor 40. The fan 401 may be driven to rotate about an axis.

At least one of the two or more battery pack interfaces may be disposed at the front side of the second housing 41. Otherwise, the battery pack interface 47 may be located at the rear side of the second housing 41, and the other battery pack interface 48 may be located at the front side of the second housing 41. Meanwhile, the second housing 41 may be formed at its left side or right side with one or more through holes or vents by which the air flow generated by the fan 401 can pass, and the fan 401 may be disposed within the second housing 41. The fan 401 may be disposed within the adaptor 40 and located at the left side or right side of the battery pack interfaces 47, 48. Further, the fan 401 may be provided within the second housing 41 and located at the left side or right side of the battery pack interfaces 47, 48.

The adaptor 40 may include circuit boards 402a, 402b, 402c, a semiconductor device 403 and a radiator 404. The semiconductor device 403 is connected to the circuit board 402a, and the radiator 404 is connected to the semiconductor device 403. The air flow that is generated by the fan 401 is to flow through the radiator 404 to dissipate the heat of the semiconductor device 403.

Figure 12:
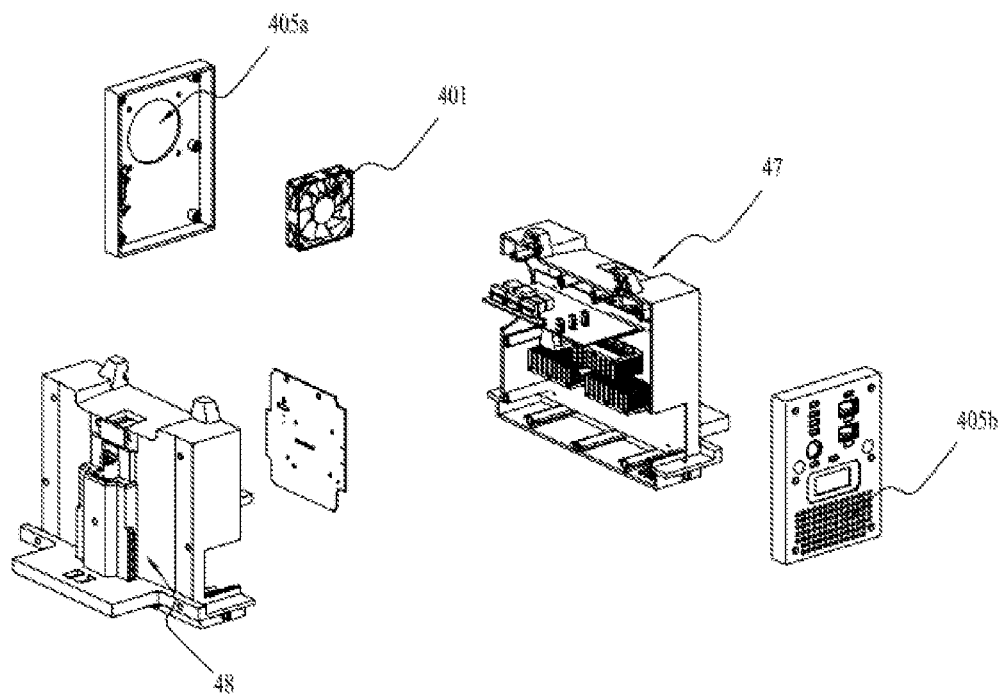
FIG. 12 is a schematic exploded view of some of the components in the portable electrical energy system as shown in FIG. 7.

As shown in FIG. 12, the second housing 41 is formed at its left side with an air inlet 405a by which the air flow that is generated by the fan 401 enters an interior of the second housing 41, and formed at its right side with an air outlet 405b by which the air flow of the fan 401 flow out of the second housing 41. The air inlet 405a and the air outlet 405b are set to be offset or staggered from each other in the upper and lower directions.

The axis of the fan 401 is located between the two battery pack interfaces 47, 48, and the radiator 404 is located between the two battery pack interfaces 47, 48. The axis of the fan 401 is located between the two battery pack interfaces 47, 48 so as to generate the air flow which flows from the left to the right.

Figure 10:
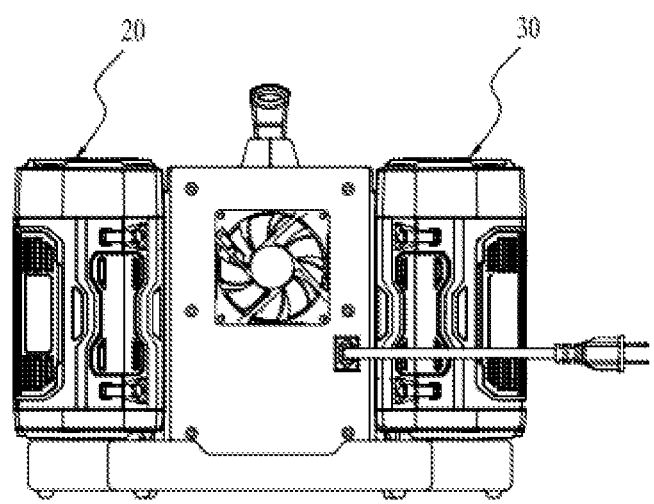
FIG. 10 is a schematic view from one side of the portable electrical energy system as shown in FIG. 7.
Figure 11:
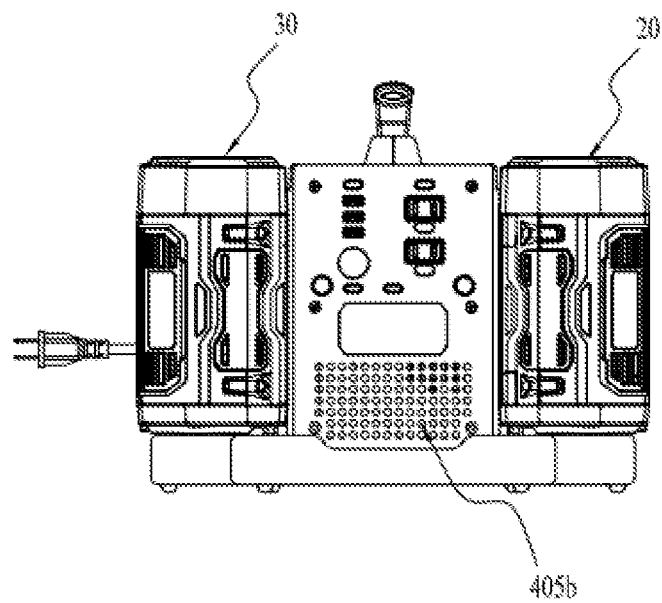
FIG. 11 is a schematic view from the other side of the portable electrical energy system as shown in FIG. 7.
Figure 13:
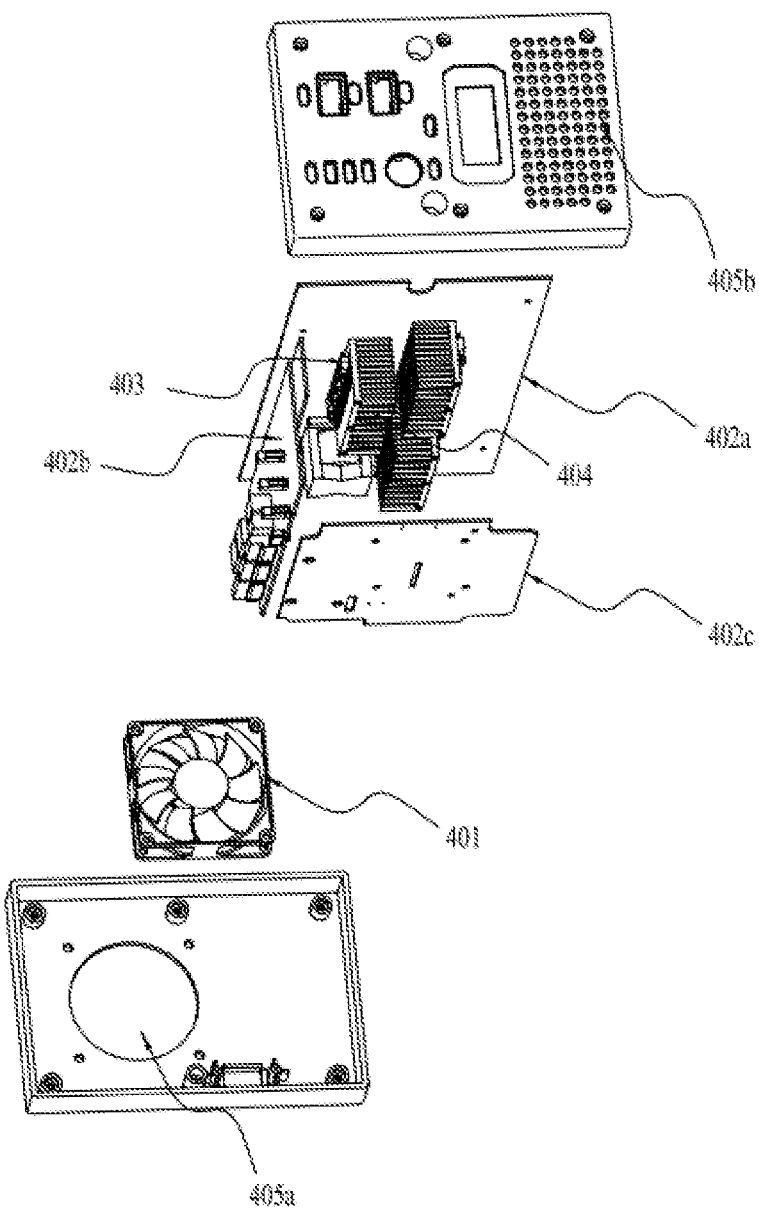
FIG. 13 is an enlarged view of a partial structure of FIG. 12.

The circuit board is disposed at the front or back side of the second housing. As shown in FIGS. 12 and 13, the circuit board 402a is disposed at the back side of the second housing 41 while the circuit board 402c is disposed at the front side of the second housing 41. And the radiator 404 is disposed between the circuit board 402a and the circuit board 402c. The adaptor 40 may include one or more AC input ports by which the adaptor 40 may receive an alternating current from an electrical grid. The AC input port may be located at the left or right side of the adaptor 40. As shown in FIG. 10, the AC input port may be formed as a power source plug 42. The AC input port is located at the left side of the adaptor 40.

The adaptor 40 may include one or more AC output ports by which the adaptor 40 outputs the alternating current. The AC output port may be disposed at the left or right side of the adaptor 40. Specifically, the AC output ports may be formed as the power source plugs 43, 44 of FIG. 9. The AC output ports may be located at the right side of the adaptor 40. The AC output port and the AC input port may be located at two opposite sides of the adaptor 40.

Figure 9:
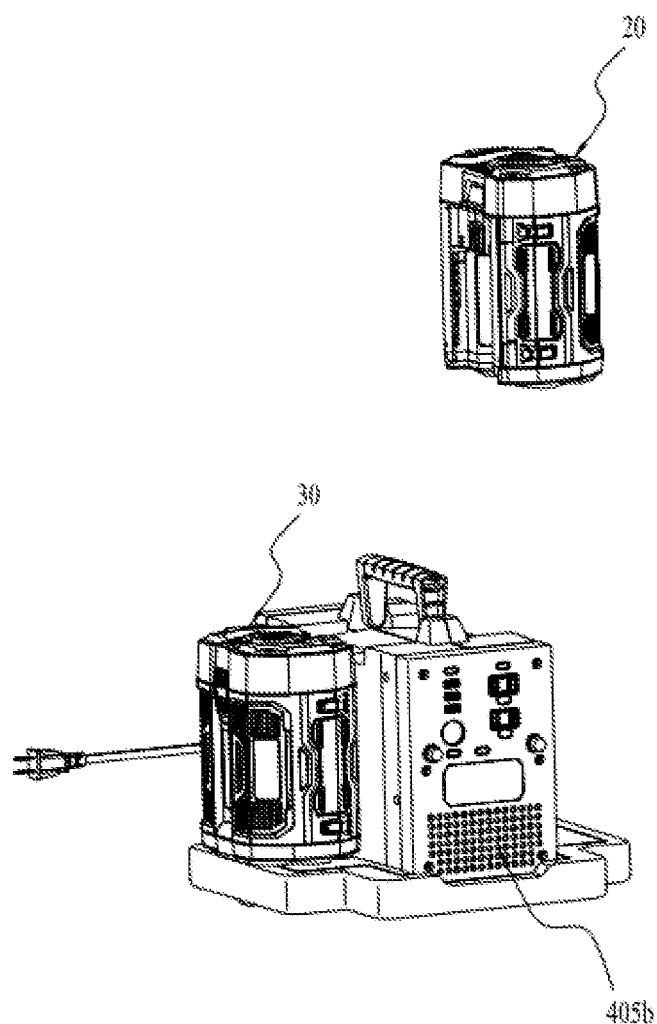
FIG. 9 is a schematic perspective view of the portable electrical energy system as shown in FIG. 7 with the battery packs being removed.

The adaptor 40 may include one or more DC output ports by which the adaptor 40 outputs the direct current. The DC output port may be located at the left or right side of the adaptor 40. The DC output port may be formed as the USB port 45, the voltage of which is 5V, as shown in FIG. 9, be formed as the vehicle power source port 46, the voltage of which is 12V as shown in FIG. 9, or may be formed as another form of ports suitable for any other apparatus of the electric tool field or vehicle field. The DC output port may be located at the right side of the adaptor 40. The DC output port and the AC output port may be located at the same or different sides of the adaptor 40.

In an alternative embodiment, the adaptor may include a user interface by which the user operates the adaptor. The user interface may be provided at the left, right or top side of the adaptor.

In an alternative embodiment, the adaptor may include a display interface for displaying information associated with the portable power station. The display interface may be also provided at the left, right or top of the adaptor.

In an alternative embodiment, the adaptor may include a projector which may project images and show information associated with the portable power station.

In an alternative embodiment, the adaptor may include a monitor shows information associated with the adaptor.

In an alternative embodiment, the adaptor may include a player plays video or music.

In an alternative embodiment, the portable power station may include a photovoltaic plate that can change the solar energy from the photovoltaic plate into electrical energy to charge the battery pack or to be inputted into the adaptor. In an embodiment, the photovoltaic plate may be provided on the adaptor. Otherwise, the adaptor may include the photovoltaic plate.

In an alternative embodiment, the adaptor may include an illumination light uses the electrical energy to illuminate.

Figure 6:
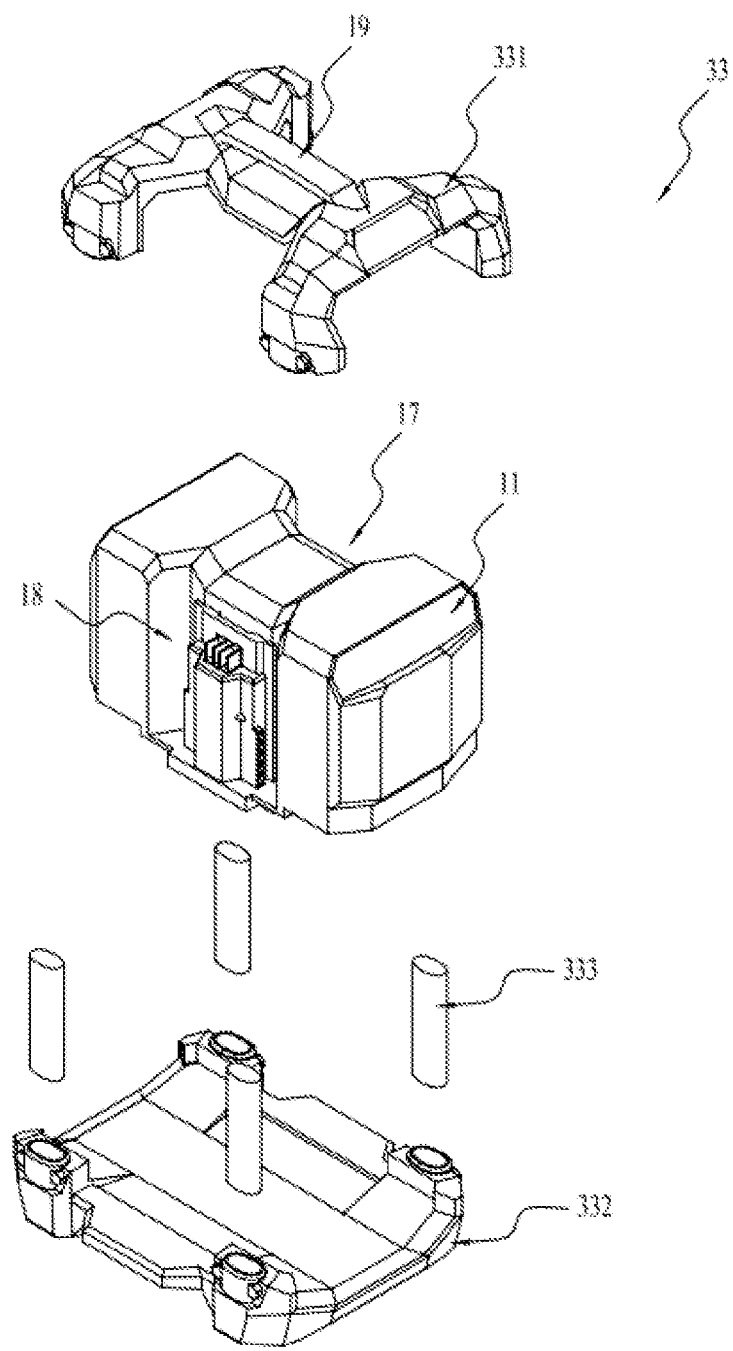
FIG. 6 is a schematic exploded view of the portable electrical energy system as shown in FIG. 1.
Figure 7:
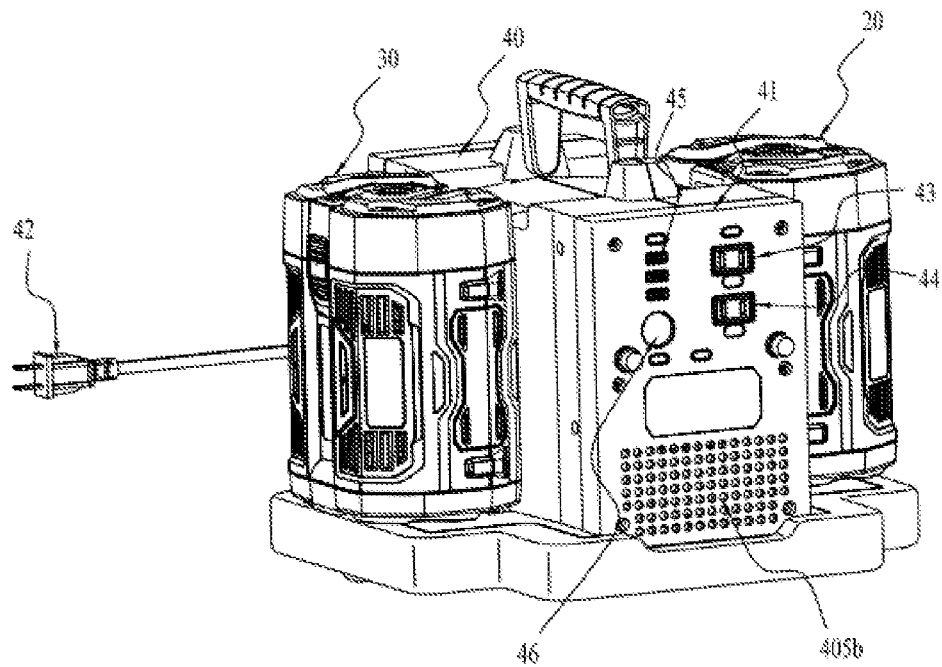
FIG. 7 is a schematic perspective view of another exemplary portable electrical energy system.
Figure 8:
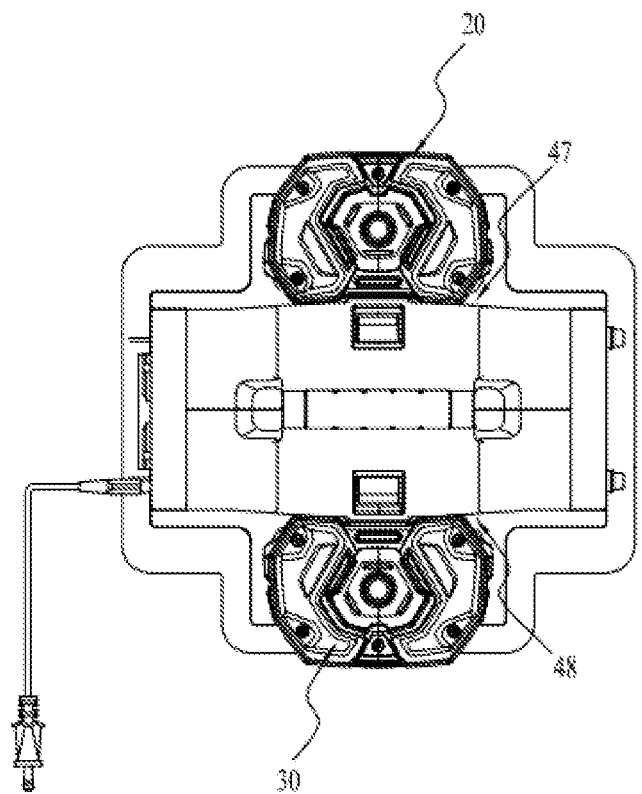
FIG. 8 is a top view of the portable electrical energy system as shown in FIG. 7.

As shown in FIG. 6, the adaptor 10 includes a protecting frame 33 which is provided at the outside of two opposite sides of the second housing 11. The protecting frame 33 is for protecting the second housing 11. Specifically, the protecting frame 33 includes a top seat 331, a bottom seat 332 and supporting pillars or columns 333. The top seat 331 is provided at the top of the second housing 11 for protecting the top of the second housing 11. The bottom seat 332 is provided at the bottom of the second housing 11 for protecting the bottom of the second housing 11. The supporting pillar or column 333 is configured to connect the bottom seat 332 to the top seat 331. The adaptor 10 may be provided with a plurality of supporting pillars or columns 333 for connecting the bottom seat 332 with the top seat 331.

The guiding rails are configured to slidably connect the removable battery pack with the adaptor. The supporting pillars or columns 333 extend in a direction that is substantially parallel to the guiding rails. The battery pack interface is configured to removably receive the at least one battery pack. The battery pack interface may be provided at the front or back of the second housing, and the battery pack may be located between the two supporting seats 31 when it is coupled to the battery pack interface. The fan cools the elements with the adaptor 10, and may be provided inside the second housing. The fan may be located between two supporting pillars or columns 333.

In an embodiment, the adaptor 10 includes a damping unit comprising one or more elastic elements received in at least one of the supporting columns so as to damp the impact between the protecting frame 33 and the second housing 11. The damping unit may include a flexible part. The flexible part may be set or disposed between the bottom seat 332 and the second housing 11 or between the second housing 11 and the top seat 331.

In an embodiment, the damping unit may include an elastic part that is provided between the bottom seat and the top seat for damping the impact therebetween. The elastic part can be received in the supporting pillars or columns 333. Each of the multiple supporting pillars or columns 333 may be provided with an elastic part.

The top seat 331 may be provided with a handle 19 for a user to grip. The two battery pack interfaces 17, 18 may be located at two sides of the handle respectively.

Figure 14:
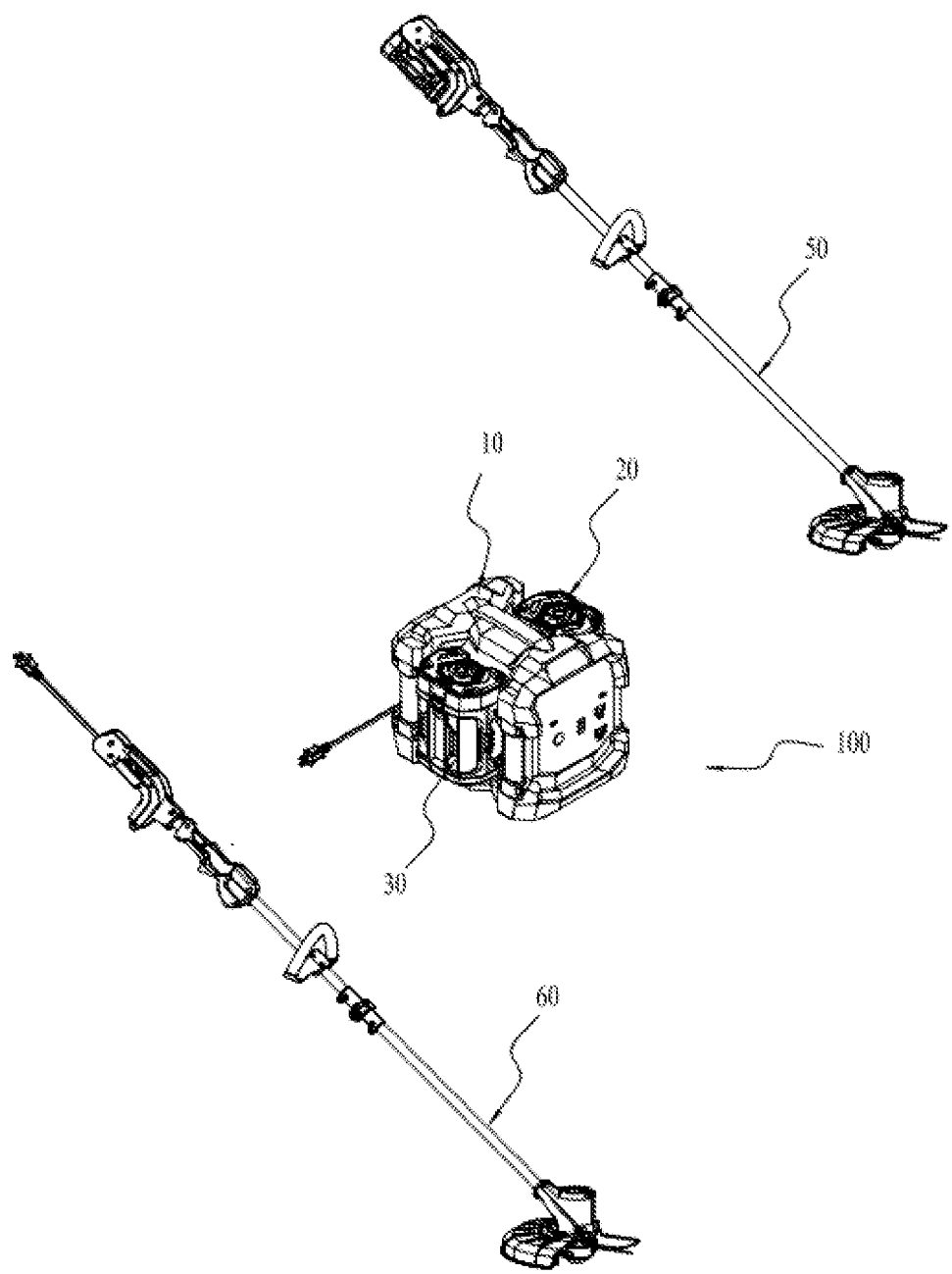
FIG. 14 shows an electrical energy system as an example.

The portable power station 100 with the DC electric tool 50 coupled thereto constitutes a new electrical energy system. As shown in FIG. 14, the battery packs 20, 30 may be detachably or removably coupled to the DC electrical tool 50 so as to supply power for the DC electrical tool, such as garden equipment or grass trimmer. The DC electrical tool includes an electric device that needs the power from the at least one battery pack 20, 30. For example, the electric device may include a motor.

The portable power station 100 with the DC electric tool 50 and an AC electric tool 60 selectively coupled thereto constitutes another new electrical energy system. As shown in FIG. 14, the battery packs 20, 30 may be detachably or removably coupled to the DC electric tool 50 or the AC electric tool 60, which may include a handheld power tool, a garden tool or vehicle, to directly or indirectly supply power for the battery packs 20, 30. The AC electric tool 60 may include a motor. The one or more AC output ports are configured to output an alternating current to the AC electric tool 60 to supply power for the AC electric tool 60, which may also include a handheld power tool, a garden tool or vehicle.

Figure 17:
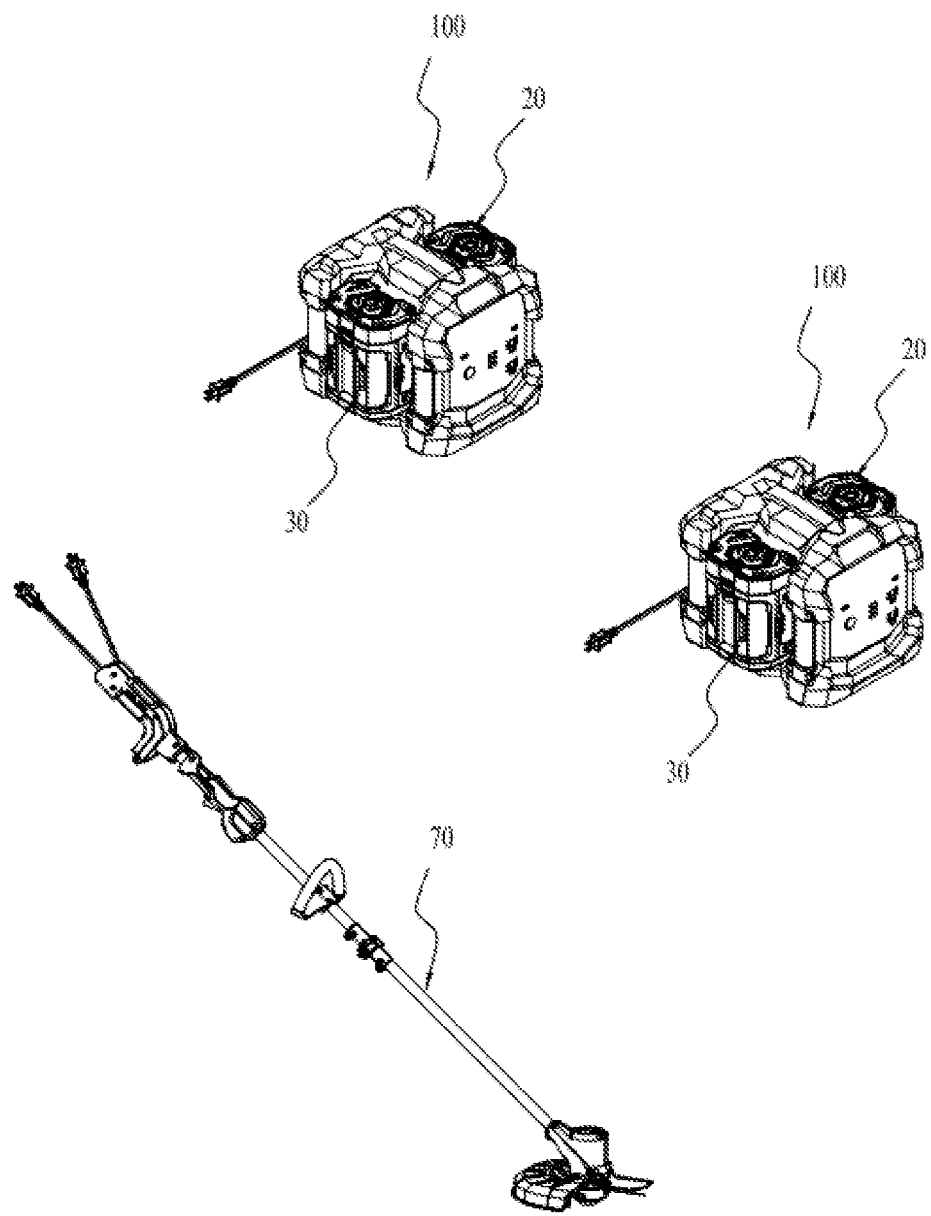
FIG. 17 shows another electrical energy system of an example.

In FIG. 17, an electric energy system may include two adaptors, i.e. that is a first adaptor and a second adaptor. The two adaptors may be same or different. In an embodiment, the entire electric energy device 100 may adopt the first adaptor and the second adaptor. At least one battery pack may be removable coupled to the adaptor 10. The two adaptors 10 together supply power for the electric tool 70. It should be noted that the entire electric energy device 100 may include more than two adaptors to be combined together for supply power to the electrical equipment that needs a greater power, wherein the electrical equipment may be a vehicle or mower vehicle.

In an embodiment, the two adaptors 10 may be together coupled to the electric tool 70. As such, the voltage of the two adapters 10 that supply power to the power tool 70 may be doubled or superimposed as compared with one adapter 10 for the power tool 70. For example, the two adaptors 10, with the output voltage of each adaptor being 36 V, and may be doubled to be 72 V for supply power to the electric tool 70. Alternatively, the output voltage of one of the two adaptors 10 is 36 V, and the output voltage of the other adaptor 10 is 48V, and the output voltage of the two adaptors 10 may be superimposed to be 84 V. Of course, it is possible for no superimposition of the output voltages of two adaptors, i.e., the output voltage of each of the two adaptors 10 is 36 V, and the output voltage for the electric tool 70 is still 36 V. Of course, the two adaptors 10 may simultaneously output the alternating or direct currents, or one adaptor 10 outputs an alternating current while the other adaptor 10 outputs the direct current to the electric tool 70.

In an embodiment, the two adaptors 10 are coupled in series and together to the electric tool 70. In an example, one adaptor 10 may charge the other adaptor 10, and then the charged adaptor 10 may supply power for the electric tool 70. In an alternative example, the first adaptor 10 may charge the electric tool 70, while the second adaptor 10, coupled to the first adaptor 10, does not charge the first adaptor 10, wherein the first adaptor 10 is merely used for a transmission line acts like an electric wire for supplying power to the electric tool 70.

Figure 19:
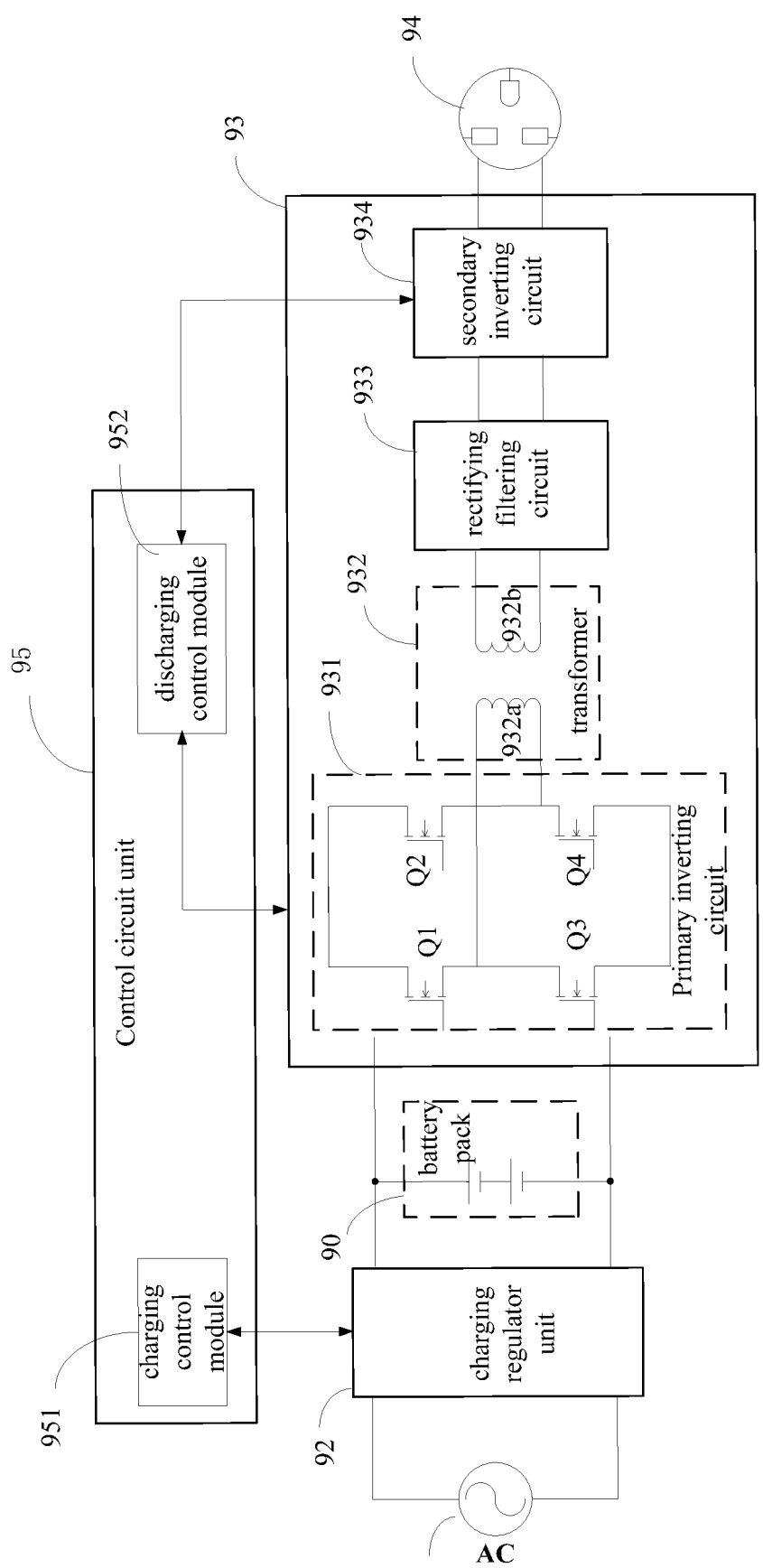
FIG. 19 shows a circuit diagram of the portable electrical energy system of FIG. 18.

Referring to a principle block diagram of an adaptor 900 shown in FIGS. 18-19. The adaptor 900 may include an electrical connection terminal 901, an AC input port 91, a charging or charging regulator unit 92, a discharging or discharging regulator unit 93, at least one AC output port 94 and a control circuit or control circuit unit 95. The discharging or discharging regulator unit may include at least one AC discharging regulator unit 93 and at least one DC discharging regulator.

The input end of the discharging or discharging regulator unit 93 is electrically coupled to the electrical connection terminal 901 of the adaptor 900. The output end of the discharging or discharging regulator unit 93 is electrically coupled to the AC output port. The input end of the charging or charging regulator unit 92 is electrically coupled to the AC input port 91. The output end of the charging or charging regulator unit 92 is electrically coupled to the electrical connection terminal 901 of the adaptor 900. The charging or charging regulator unit 92 and the discharging or discharging regulator unit 93 are coupled to the control circuit or control circuit unit 95 respectively.

It should be noted that the electrical connection mentioned in this disclosure may include the direct and/or indirect connection.

The control circuit or control circuit unit 95 is configured to control the operation of the charging or charging regulator unit 92 and/or the discharging or discharging regulator unit 93. The control circuit or control circuit unit 95 includes a charging control module 951 and a discharging control module 952. Herein, a charging control module 951 and a discharging control module 952 are both included within the adaptor or power station. Alternatively, the charging control module may be included within the removable battery pack or power module and the discharging control module may be included in the adaptor or power station. Or, a part of the control circuit or control circuit unit may be set in the removable battery pack or power module, and another part of the control circuit or control circuit unit may be set in the adaptor or power station to achieve the charging and discharging between the removable power module and the power station, or between the power station and the external electrical device.

In one aspect, when the electrical power or capacity of a battery pack 90 is low and needs to be charged, the battery pack 90 can be coupled to the adaptor 900. The adaptor 900 may be provided with a switching button which is electrically coupled to the control or control circuit unit 95 so as to achieve switching between a charging mode and a discharging mode. When the battery pack 90 needs to be charged, a user may operate a switching button to actuate the charging mode. In the charging mode, the control or control circuit unit 95 is configured to judge whether the electrical connection terminal 901 of the adaptor 900 is electrically coupled to a power source terminal of the battery pack 90.

When the electrical connection terminal 901 is electrically coupled to the power source terminal of the battery pack 90, a corresponding signal can be detected at the electrical connection terminal 901 and/or the power source terminal. The adaptor 900 may include a voltage detecting module 96 which is electrically coupled to the control or control circuit unit 95. The voltage detecting module 96 may be configured to detect the voltage change of the electrical connection terminal 901 of the adaptor 900, and then the control or control circuit unit 95 may determine whether the electrical connection terminal 901 is electrically coupled to the power source terminal of the battery pack 90.

Alternatively, the adaptor 900 may include a current detecting module 97 for detecting the current change of the electrical connection terminal 901 and/or the power source terminal. Thus the detected current change of the electrical connection terminal 901 and/or the power source terminal by the current detecting module 97 may determine whether the electrical connection terminal 901 is electrically coupled to the power source terminal of the battery pack 90. Or the current detecting module 97 and/or the voltage detecting module 96 may be used to detect the voltage change and/or the current change of the electrical connection terminal 901 and/or the power source terminal, it is determined that the electrical connection terminal 901 of the adaptor 900 is electrically coupled to the power source terminal of the battery pack 90.

Specifically, the electrical connection terminal 901 of the adaptor 900 may include a DC input positive terminal A+, a DC input negative terminal A− and a DC communication terminal D, and the power source terminal of the battery pack 90 may include a power source positive terminal, a power source negative terminal and a power source communication terminal. When the electrical connection terminal 901 of the adaptor 900 is coupled to the power source terminal of the battery pack 90, the power source positive terminal is coupled to the corresponding DC input positive terminal, the power source negative terminal is coupled to the corresponding DC input negative terminal, and the DC communication terminal is coupled to the corresponding power source communication terminal.

In an alternative embodiment, the change of electrical signal at the power source terminal of the battery pack 90 may be detected by its own voltage detecting module 96 and/or current detecting module 97 of the battery pack, and may be transmitted to the control or control circuit unit 95 by a communication connection between the power source communication terminal of the battery pack 90 and the DC communication terminal of the adaptor 900, and the control or control circuit unit 95 can determine whether an electrical connection is established between the electrical connection terminal 901 and the power source terminal accordingly. Alternatively, the control or control circuit unit 95 of the battery pack 90 may determine whether an electrical connection is established between the electrical connection terminal 901 of the adaptor 900 and the power source terminal of the battery pack 90.

When the electrical connection is detected to be not established between the electrical connection terminal 901 and the power source terminal, the user adjusts the interconnection between the battery pack 90 and the adaptor 900 until the interconnection between the electrical connection terminal 901 and the power source terminal forms a reliable electrical connection.

Specifically, the adaptor 900 may be provided with a display device electrically coupled to the control or control circuit unit 95. The display device, such as an indicating light, may be provided on the adaptor 900. When the electrical connection terminal 901 is coupled to the power source terminal, the indicating light becomes green; when the electrical connection does not form between the electrical connection terminal 901 and the power source terminal, the indicating light becomes red for reminding the user. Or, the user may use the display device of the battery pack 90 for reminding the user.

When an electrical connection forms between the electrical connection terminal 901 and the power source terminal, whether the AC input port is coupled to the alternating current is detected.

The voltage detecting module 96 or the current detecting module 97 may be used to detect the voltage change or the current change of the AC input port. If there is the change of the voltage or the current shows the AC input port is electrically coupled to the alternating current.

If there is no change of the voltage or the current, the AC input port is determined to be not coupled to the alternating current. Specifically, the adaptor 900 may be provided with a display light that shows whether the alternating current is inputted into the AC input port. The display light becomes green when there is an alternating current to be inputted into the AC input port, the display light becomes red when there is no alternating current inputted into the AC input port, thus giving a reminder to the user.

It should be noted that the display light for showing whether the AC input port is inputted into the alternating current and the indicating light for showing whether the electrical connection terminal 901 of the adaptor 900 is electrically coupled to the power source terminal of the battery pack 90 may be the same or two independent lights.

When the AC input port is configured to receive the alternating current, the charging or charging regulator unit 92 begins to work, and charges the battery pack 90 through the charging or charging regulator unit 92.

When the battery pack 90 has no sufficient power or capacity and needs to be charged by the alternating current, in order to reduce the waiting time for charging, the control or control circuit unit 95 may be configured to: when the AC input port of the adaptor 900 is configured to receive the alternating current, send a control command for enabling the charging or charging regulator unit 92 to operate and the discharging or discharging regulator unit 93 not to operate, therefore charging the battery pack 90 by controlling the charging or charging regulator unit 92. In other words, the adaptor 900 does not discharge outward during the charging of the battery pack 90, so as to save the power of the battery pack 90 and reduce the charging waiting time of the battery pack 90.

It is determined whether the voltage value of the battery pack 90 reaches a predetermined voltage value. If the predetermined voltage value is reached, it indicates the battery pack 90 finishes charged, and the charging is stopped; if the predetermined voltage value is not reached, the battery pack 90 is charged continuously until the predetermined voltage value is reached.

Specifically, the voltage of the battery pack 90 may be detected by its voltage detecting module 96 of the battery pack 90, or may be detected by the voltage detecting module 96 of a portable input device.

The control or control circuit unit 95 may include a charging control module 951 for controlling the charging or charging regulator unit 92 to charge the battery pack 90.

The charging control module 951 may control the charging or charging regulator unit 92 to charge the battery pack 90 by a manner, such as fast charging, slow charging or impulse charging.

The battery pack 90 coupled to the adaptor 900 generally has a large capacity or power. However, when the electric device needs a small amount of electricity or power, it is not necessary to charge battery pack 90 fully before supplying power to the electric device. To facilitate the user to know the charging status of the battery pack 90, the charging control module 951 may output a control command which represents different charging status of the battery pack 90 according to a detected voltage value of the battery pack 90.

For example, the charging control module 951 may output a first control signal represents a first charging status of the battery pack 90 when the voltage of the battery pack 90 reaches a half of the rated voltage of the battery pack 90, and may output a second control signal represents the battery pack reaches a full charging status when the voltage of the battery pack 90 reaches a predetermined voltage value of the battery pack 90.

In an alternative embodiment, the charging control module 951 may have one or more charging modes. For example, the charging control module 951 may charge the battery pack 90 by using the different charging modes according to the detected information about the capacity or power of the battery pack 90 so as to increase the charging efficiency of the battery pack 90. When it is detected that the capacity or power of the battery pack 90 is less than one third of the total capacity or power of the battery pack 90, the battery pack 90 may be charged in a manner of fast charging for 20 minutes and then charged in a manner of constant voltage; when it is detected that the capacity or power of the battery pack 90 is greater than a half of the total capacity or power of the battery pack 90, the battery pack 90 may be charged in the manner of impulse charging.

Figure 20:
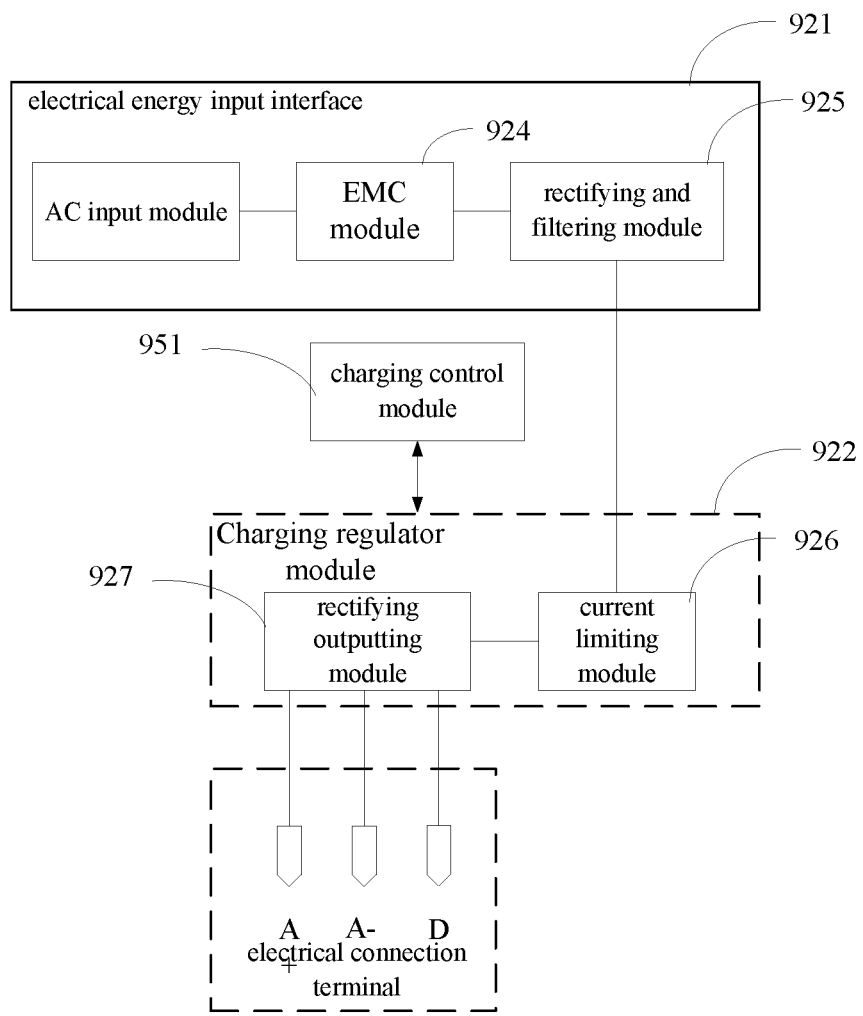
FIG. 20 shows a circuit diagram of a charging unit in FIG. 19.

The charging or charging regulator unit 92 will be described with reference to FIG. 20. The charging or charging regulator unit 92 is configured to couple the electrical energy input interface 921 to the at least one battery pack and to charge the at least one battery pack 20, 30 with the electrical energy received from the electrical energy input interface 921. In an example, the charging or charging regulator unit 92 may include an electrical energy input module or interface 921 and a charging or charging regulator module 922.

The electrical energy input interface 921 is configured to receive AC power source. When the capacity or power of the battery pack 90 is insufficient, the battery pack 90 may be charged by the adaptor 900. When charging, the adaptor 900 inputs the AC power source via the electrical energy input interface 921. The AC power source may be a power source from an AC electrical grid.

Furthermore, the electrical energy input interface 921 may include an AC input module for coupling to the AC input port 91, an EMC module 924 for eliminating electromagnetic interference, and a rectifying and filtering module 925 for regulating electrical energy. The EMC module 924 is configured to couple the AC input module to the rectifying and filtering module 925. The rectifying and filtering module 925 is coupled to the charging or charging regulator unit 92.

The charging or charging regulator module 922 is configured to couple the electrical energy input interface 921 to the electrical connection terminal 901 so as to convert the input alternating current into the direct current, which is suitable for the electrical connection terminal 901.

The battery pack 90 is removably coupled to the adaptor 900 via the electrical connection terminal 901. The DC input positive terminal A+ is electrically connected to the power source positive terminal, the DC input negative terminal A+ is electrically connected to the power source negative terminal, and the DC communication terminal D is electrically connected to the power source communication terminal, so that a physical connection between the battery pack 90 and the adaptor 900 is established to transmit electrical energy and/or signal therebetween. When the battery pack 90 is charged by the adaptor 900, the direct current transmitted by the charging or charging regulator module 922 is outputted to the battery pack 90 through the electrical connection terminals 901.

Since the electrical energy supplied from the AC electrical gird is not suitable to charge the battery pack 90 directly, the regulation or adjustment needs to be performed by the charging or charging regulator module 922. Specifically, the charging or charging regulator module 922 comprises a current limiting module 926, which may include a resonant circuit, and a rectifying outputting module 927 for supplying power to the electrical connection terminal 901.

The charging control module 951 in the control or control circuit unit 95 is electrically coupled to the charging regulator module 922 to perform charging control of the charging regulator module 922. For example, the charging control module 951 may control whether the charging regulator module 922 selectively outputs electrical energy from the charging regulator module 922 to the DC input positive terminal A+ and the DC input negative terminal A−.

When the adaptor 900 is set to charge two battery packs 90, the charging control module 951 is configured to charge one of the two battery packs 90 until it is fully charged, and then charge the other battery pack 90. Alternatively, the charging control module 951 may be configured to charge the two battery packs 90 simultaneously, and the charging or charging regulator unit 92 may include two charging regulator modules 922 that are connected to the two electrical connection terminals 901 respectively wherein the two charging regulator modules 922 may share a common electrical energy input module 921. Thus, the respective charging regulator modules 922 can charge the two battery packs simultaneously via the corresponding electrical connection terminals 901 under the control of the charging control module 951.

In another aspect, when the AC output port of the adaptor 900 needs to be coupled to an electric device, the control or control circuit unit 95 may send a control command for activating the discharging or discharging regulator unit 93 to work so that the electric power of the battery pack 90 can be outputted to the electric device, which is coupled to the adaptor 900, through the discharging or discharging regulator unit 93 while the charging or charging regulator unit 92 is controlled to do no work. That is to say, the adaptor 900 does not perform charge when performing discharge outsides, signal interference between the charging or charging regulator unit 92 and the discharging or discharging regulator unit 93 can be greatly reduced.

When the adaptor 900 is needed to supply the alternating current, a user may operate a switching button to actuate the discharging mode. In the discharging mode, the control or control circuit unit 95 is configured to:

Judge whether an electrical connection is formed between the electrical connection terminal 901 and the power source terminal. The detailed implementation is similar to that of the charging mode and will not be described again.

When the electrical connection is judged to be established between the electrical connection terminal 901 and the power source terminal, the AC output port 94 is detected to determine whether it is coupled to the electric device.

That the voltage detecting module 96 is coupled to the AC output port 94 and the connection between the AC output port 94 is coupled to the electric device will induce a contact resistance, which enables the voltage of the AC output port 94 to change. When the voltage detecting module 96 detects the change of voltage, it is determined that the AC output port 94 is successfully coupled to the electric device. Of course, whether the AC output port 94 is successfully coupled to an electric device can be judged or determined by detecting the contact resistance of the AC output port 94.

The AC output port 94 may include an AC positive terminal and an AC negative terminal. When an electrical connection is formed between the electrical connection terminal 901 and the power source terminal, the AC positive terminal and the AC negative terminal become the charged terminals. In order to secure the safe use of electricity, a first switching device may be connected in series between the AC positive terminal and the discharging or discharging regulator unit 93, and a second switching device may be connected in series between the AC negative terminal and the AC output circuit. When detecting the AC output port 94 is not connected to the electric device, the control or control circuit unit 95 can output a control signal to switch off the two switching devices. When detecting the AC output port 94 is connected to the electric device, the control or control circuit unit 95 can output a control signal to switch on the two switching devices so as to output an alternating current.

When the AC output port 94 is coupled to the electric device, a control signal for controlling the discharging or discharging regulator unit 93 is outputted to enable the discharging or discharging regulator unit 93 to work.

Referring to FIG. 19, the discharging or discharging regulator unit 93 is connected in series between the electrical connection terminal 901 and the AC output port 94 to convert the direct current of the battery pack 90 into the alternating current output.

Since the direct current cannot be converted into the alternating current directly, it is needed to have the discharging or discharging regulator unit 93 to do such a conversion.

The discharging or discharging regulator unit 93 may include a primary inverting circuit 931, a transformer 932, a rectifying filtering circuit 933, a secondary inverting circuit 934 and a discharging control module.

An input port of the primary inverting circuit 931 is electrically coupled to the electrical connection terminal 901, and an output port thereof is electrically coupled to a first coil 932a of the transformer 932 to provide a phase-adjusting alternating current to the first coil 932a.

Referring to FIG. 19, the primary inverting circuit 931 may include four switching elements Q1, Q2, Q3 and Q4, which are controlled by a discharging control module 952, so that a direct current from an input port of the primary inverting circuit 931 is modulated or regulated into the phase-adjusting alternating current that is needed by the first coil 932a of the transformer 932. The AC output circuit including the primary inverting circuit 931 acts as a discharging regulator which is configured to receive electrical energy from an energy storage unit, for example the one or more battery packs, and selectively transmit the electrical energy supplied by the energy storage unit, such as the one or more battery packs to AC output port 94 by the regulation of the AC output circuit. Or, the AC output circuit or AC discharging regulator may be employed to receive the at least one battery pack from an energy storage unit such as the battery pack, and to selectively output the electrical energy from the energy storage unit to AC output port 94 after regulation.

Figure 21:
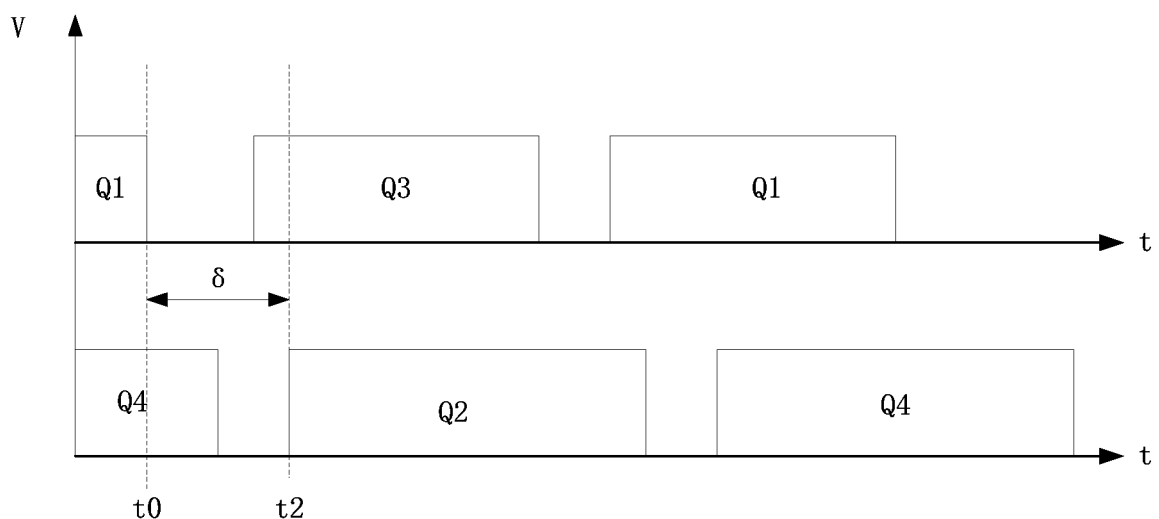
FIG. 21 shows a diagram of the turning-on or turning-off status of a switching element in a inverting circuit in one period.

In an embodiment, the primary inverting circuit 931 may be a full bridge inverting circuit. The discharging control module 952 may regulate the alternating current and further output to the first coil 932a by a manner of the phase shift control. The turning-on and turning-off status of the four switching elements in one period by the control of the discharging control module 952 is shown in FIG. 21, wherein A phase difference corresponding to the time period [t0, t2] may be defined as a phase shift angle. The discharging control module 952 is configured to adjust the alternating current outputted by the primary inverting circuit 931 by adjusting a magnitude of the phase shift angle, and the phase shift angle is smaller, the voltage of the output alternating current is higher. The switching elements may be field effect transistors, bipolar transistors or power transistors.

The transformer 932 has the function of increasing the voltage of the alternating current, and may include a first coil 932*a* and a second coil 932*b*. In order to achieve the soft start of the switching elements, resonant inductors may be coupled between the primary inverting circuit 931 and the first coil 932*a* of the transformer 932. The addition of the resonant inductor will introduce other electronic components and power consumption, and the output efficiency of the discharging or discharging regulator unit 93 may be decreased with the increasing cost of circuit. In an embodiment, the resonant inductors may be coupled into the transformer, and the transformer 932 with the resonant inductors reduced may be directly used to achieve the soft start of the switching elements, which effectively reduces the power consumption generated by the resonant inductor with the whole cost cut down.

In order to improve the utilization of the transformer 932, reduce the current of the switching elements with the less consumption and cost, the ratio between the first coil 932*a* and the second coil 932*b* of the transformer should be as large as possible. In this embodiment, the ratio between the number of turns of the first coil 932*a* and that of the second coil 932*b* ranges from 1:6 to 1:8. The ratio between the leakage inductance of the transformer 932 and the excitation inductance of the first coil 932*a* may range from 3% to 5%.

The rectifying and filtering circuit 933 is electrically coupled to the second coil 932*b* of the transformer 932 to rectify and filter the AC signal produced by the transformer 932, and to output a direct current with a constant voltage. Specifically, the rectifying and filtering circuit 933 may include a rectifying unit and a filtering unit. The rectifying unit may be a half-wave rectifying circuit or a full-wave rectifying circuit for converting an input alternating current into a pulsating direct current, which may be filtered by the filtering unit to filter the unnecessary signal so as to obtain the direct current with the constant voltage.

The secondary inverting circuit 934 is electrically coupled to the rectifying and filtering circuit 933. The second inverting circuit 934 may be driven by the discharging control module 952 to convert the DC signal inputted by the DC input side of the second inverting circuit 934 into the AC signal, which is suitable for the AC output port. The inverting circuit may include multiple switching elements. The discharging control module 952 may control the turning-on or turning-off of the switching elements by a manner of bipolar and doubling frequency to output the AC signal for the AC output port.

In practice, the operation process of the portable power station will be described herein by an example that an energy storage unit, for example two battery packs 90 with the voltage of 56 V, used as DC power source configured to output an AC current with the voltage of 110 V by the adaptor 900. In an embodiment, when the electrical capacity or power of the battery pack 90 is not enough and the AC input interface 91 receives the alternating current, the charging control module 951 controls the charging or charging regulator unit 92 to operate so as to charge the energy storage unit, for example two battery packs 90 simultaneously. In the meantime, the charging control module 951 may send an operation signal in relation to the charging or charging regulator unit 92 to the control or control circuit unit 95, and the control or control circuit unit 95 may output a control command to stop the operation of the discharging or discharging regulator unit 93, which is coupled to AC output. In another embodiment, when an outside electric device needs to be charged by the battery packs 90, the AC output port 94 is used to be coupled to the outside electric device, the control or control circuit unit 95 may send a control signal to the discharging or discharging regulator unit 93, or the control or control circuit unit 95 may perform a discharging control of the discharging or discharging regulator unit 93 by its discharging control module, so that the direct current with the voltage of 56 V can be regulated by the discharging circuit or discharging regulator circuit 93, and then the AC current with the output voltage of 110 can be outputted to the AC output port 94. For example, the discharging control module 952 of control or control circuit unit 95 may output a control signal that is to control the one battery pack 90 completes discharge before the other battery pack 90 starts to discharge. The discharging control module 952 of the control or control circuit unit 95 may control the control signal to the primary inverting circuit 931 such that the direct current of the voltage of 56 V can be converted into the alternating current and then boosted to the voltage of 220 V to output the alternating current output via the transformer 932. Then, the rectifying and filtering circuit 933 may be driven by the discharging control module 952 to convert the alternating current with the voltage of 220 V into the alternating current with the voltage of 110 V for outputting.

Figure 22:
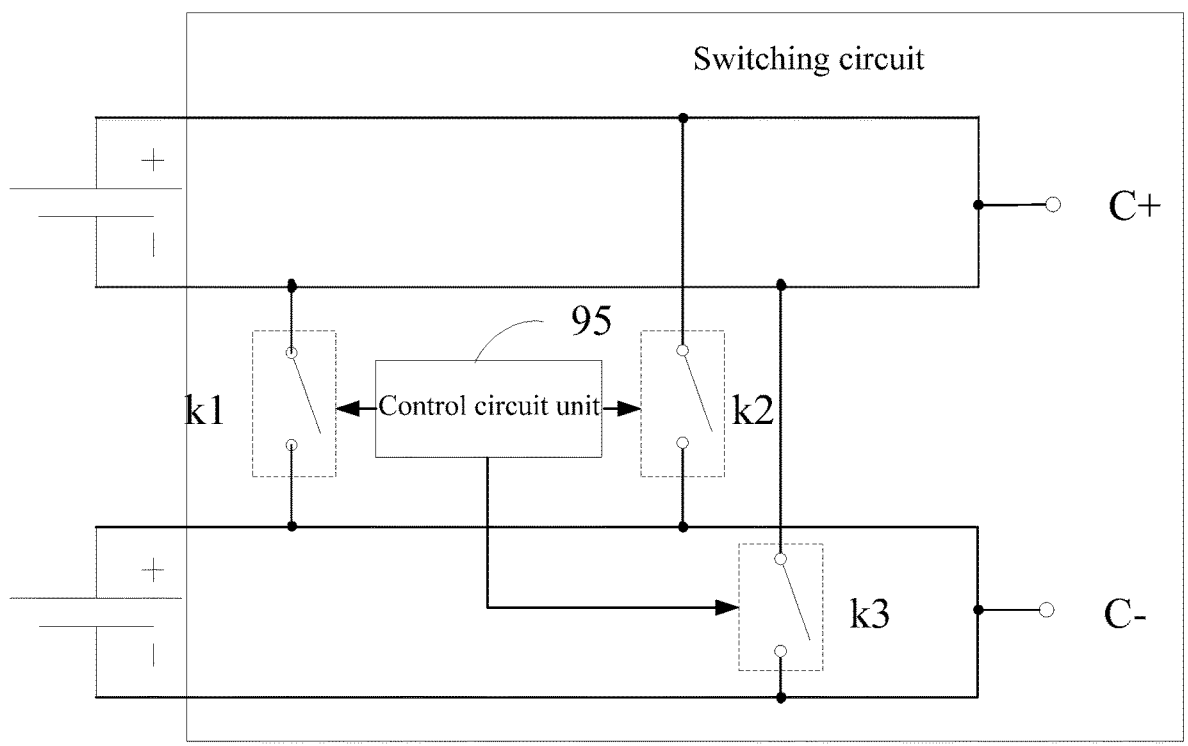
FIG. 22 shows a diagram of a switching circuit adapted for achieving the series connection or parallel connection of the battery packs in an adaptor of an example.

Referring to FIG. 22, the adaptor 900 may include a switching circuit adapted to control the connection in series or parallel of the two battery packs 90. The switching circuit includes a first switch K1 connected in series between a negative pole of the first battery pack 90 and a positive pole of the second battery pack 90, a second switch K2 connected between a positive pole of the first battery pack 90 and the positive pole of the second battery pack 90, a third switch K3 connected in series between the negative pole of the first battery pack 90 and a negative pole of the second battery pack 90, a DC positive output terminal C+, and a DC negative output terminal C−. The first switch, the second switch and the third switch are electrically coupled to the control or control circuit unit 95 respectively, and the DC voltage between the DC positive output terminal C+ and the DC negative output terminal C− defines as the input voltage of the discharging circuit or discharging regulator circuit 93.

When the control or control circuit unit 95 detects none of the voltages of the first battery pack 90 and the second battery pack 90 meets the AC output requirement of the adaptor 900, the control or control circuit unit 95 may send a first control signal to close the first switch, the first switch is closed to enable the first battery pack 90 and the second battery pack 90 to be connected in series with each other, thus providing a sufficient input voltage that is supplied to the discharging or discharging regulator unit 93. The first switch may be a diode, a triode or a field effect transistor.

When the electric capacity or power of the first battery pack 90 or the second battery pack 90 is not enough, the control or control circuit unit 95 may send a second control signal to close the second switch K2 and the third switch K3 to enable the first battery pack 90 and the second battery pack 90 to be connected in parallel in order to increase the power supply. The second switch K2 and the third switch K3 may be diodes, triodes, or field effect transistors.

Figure 23:
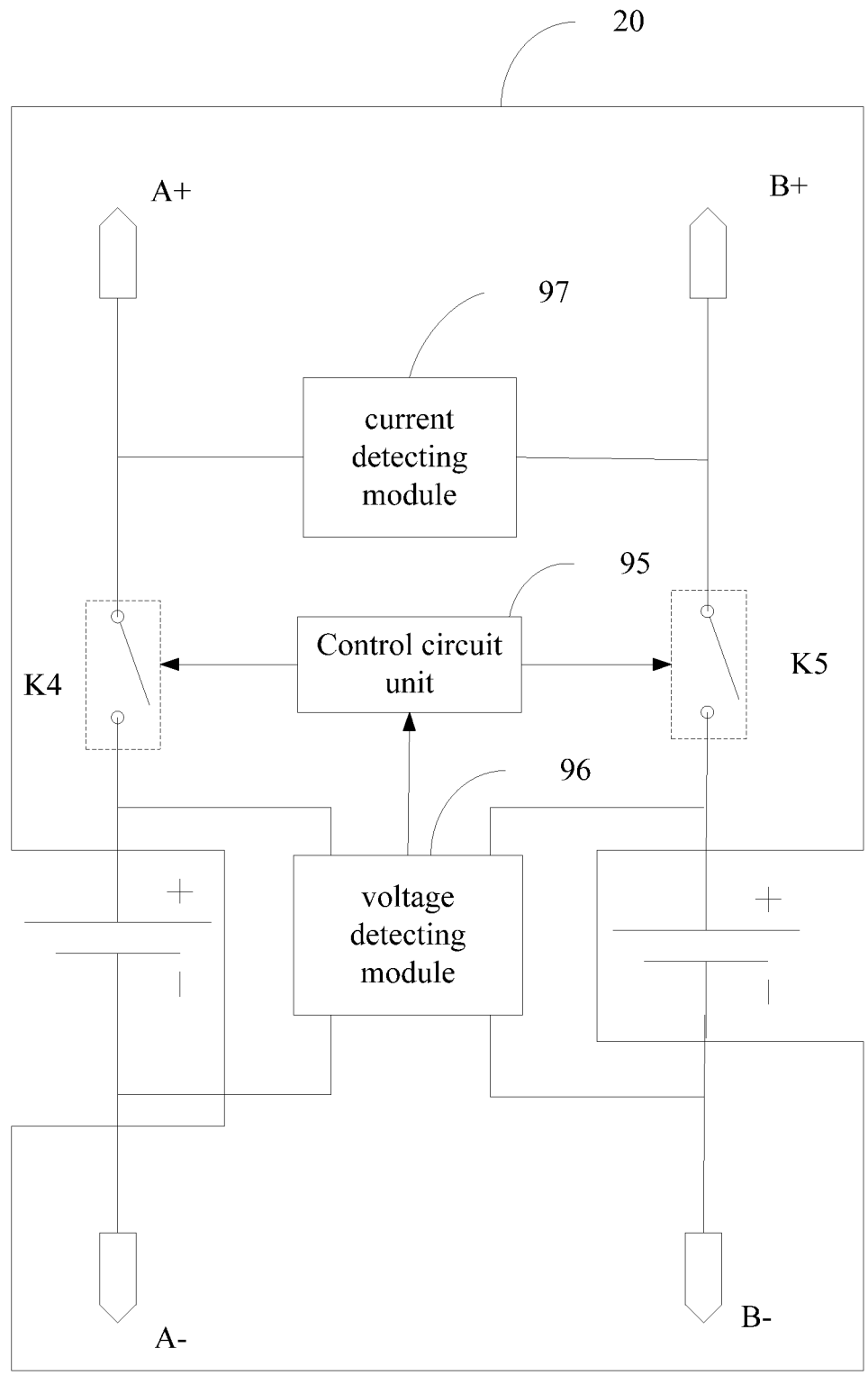
FIG. 23 shows a diagram of a circuit adapted for controlling the discharging of the two battery packs in an adaptor of an example.

As shown in FIG. 23, the adaptor 900 may include a voltage detecting module 96. When the voltage detecting module 96 detects a difference between the voltages of the first battery pack 90 and the second battery pack 90, the control or control circuit unit 95 may output a control signal to control the battery pack 90 with a higher voltage to discharge firstly until the voltages of the two battery packs 90 are equal, and then control the two battery packs 90 to discharge simultaneously.

Specifically, the adaptor 900 may include a first battery pack interface A (including a first positive terminal A+ and a first negative terminal A−) to be coupled to the first battery pack 90 and a second battery pack interface B (including a second positive terminal B+ and a second negative terminal B−) to be coupled to the second battery pack 90. A first electronic switch K4 may be connected in series between the first battery pack interface and the discharging or discharging regulator unit 93, and a second electronic switch K5 may be connected in series between the second battery pack interface and the discharging or discharging regulator unit 93. When the first battery pack interface and the second battery pack interface receive no signal, the first electronic switch K4 and the second electronic switch K5 may be controlled to be in turning-on status. When the voltage detecting module 96 detects that the voltage of the first battery pack 90 is higher than that of the second battery pack 90, the control or control circuit unit 95 may output a control signal to open the second electronic switch, so that the first battery pack 90 may discharge firstly, until the voltages of the first battery pack 90 and the second battery pack 90 are equal, and then the control or control circuit unit 95 may output a control signal to close the second electronic switch to enable the two battery packs 90 discharge simultaneously.

In an alternative embodiment, when the current detecting module 97 detects that the current direction of the first battery pack 90 or the second battery pack 90 is opposite to the discharging direction of the battery pack 90 itself, the control or control circuit unit 95 may output a control signal to enable the battery pack 90, the current direction of which is opposite to its discharging current direction, to discharge firstly, until the current directions of the two battery packs 90 are same to the discharging direction of the battery packs 90 themselves, and then the two battery packs 90 is to discharge simultaneously.

Specifically, the adaptor 900 includes a first battery pack interface to be coupled to the first battery pack 90 and a second battery pack interface to be coupled to the second battery pack 90. A first electronic switch may be connected in series between the first battery pack interface and the discharging or discharging regulator unit 93, and a second electronic switch may be connected in series between the second battery pack interface and the discharging or discharging regulator unit 93. When the first battery pack interface and the second battery pack interface receive no signal, the first electronic switch and the second electronic switch may be controlled to be both in turning-on status. When the voltage detecting module 96 detects that the current direction of the first battery pack 90 is opposite to the discharging current direction of the first battery pack 90 itself, the control or control circuit unit 95 may output a control signal to open the second electronic switch to enable the first battery pack 90 discharge, until the current direction of the first battery pack 90 is same to the discharging current direction the first battery pack 90 itself, and then the control or control circuit unit 95 may output a control signal to close the second electronic switch so that the two battery pack 90 can discharge simultaneously.

In addition, the adaptor 900 may include a plurality of DC discharging or discharging regulators and DC output ports that are electrically coupled to the respective DC discharging or discharging regulators. For example, there is a first DC discharging regulator for converting a direct current of 56 V into a direct current of 12 V, and a first DC output port is electrically coupled to the first DC discharging or discharging regulator and configured to output the direct current of 12 V; there is a second DC discharging regulator for converting the direct current of 56 V into a direct current of 19 V, and a second DC output port is electrically coupled to the second DC discharging regulator and configured to output the direct current of 19 V. A laptop computer may be connected to the second DC output port so that the adaptor 900 may be configured to supply power to the laptop computer. There is a third DC discharging regulator for changing the direct current of 56 V into the direct current of 5 V for output, and a third DC output port 986 is electrically coupled to the third DC discharging regulator 985. The third DC output port may a USB port that is coupled to a mobile phone so that the adaptor 900 may be configured to charge the mobile phone.

The adaptor 900 may include a temperature detecting module for detecting the temperature of the adaptor 900 and/or the battery pack 90 and a fan to dissipate the heat of the power device and/or the battery pack 90. The temperature detecting module and the fan may be both electrically coupled to the control or control circuit unit 95, and the control or control circuit unit 95 may output a corresponding control signal to control the operation of the fan according to the temperature detected by the temperature detecting module.

For example, when the temperature detecting module determines that the temperature of the adaptor 900 is higher than a predetermined temperature, the control or control circuit unit 95 may output a control signal to increase the rotation speed of the fan, so as to speed up the heat-dissipation. In contrast, when the detected temperature is lower than the predetermined temperature, a control signal may be outputted to decrease the rotation speed of the fan, so as to reduce the power loss during the heat dissipation.

It should be noted that the temperature of the battery pack 90 may be detected by its temperature detecting module and transmitted to the adaptor 900. Or, it may be detected by the temperature detecting module of the adaptor 900.

The above description shows and describes the basic principle, main characters and advantages of the present invention. The skilled person in the art will understand that the above embodiments does not limit the present invention in any form, and any technical solutions obtained in a manner of equivalent substitution or equivalent transformation fall into the scope of protection of the present invention.

What is claimed is:

1. A power station, comprising:
    an adaptor having an electrical energy input interface for receiving electrical energy from a power supply device, the adaptor comprising:
        a housing;
        a protecting frame provided outside of the housing;
        an electrical energy storage unit; and
        an electrical energy output port unit disposed on the housing, the electrical energy output port unit comprising:
            at least one AC output port adapted to output an alternating current; and
            at least one DC output port adapted to output a direct current;
        a charging or charging regulator unit configured to couple the electrical energy input interface to the electrical energy storage unit and to charge the electrical energy storage unit with the electrical energy received from the electrical energy input interface;
        a discharging or discharging regulator unit configured to couple the electrical energy storage unit to the electrical energy output port unit, the discharging or discharging regulator unit comprising:

a first AC discharging regulator provided between the electrical energy storage unit and the at least one AC output port and configured to receive the electrical energy from the electrical energy storage unit and selectively transmit the electrical energy supplied by the electrical energy storage unit to the at least one AC output port; and a second DC discharging regulator provided between the electrical energy storage unit and the at least one DC output port and configured to receive electrical energy from the electrical energy storage unit and selectively transmit the electrical energy supplied by the electrical energy storage unit to the at least one DC output port; and a control or control circuit unit comprising a charging control module and a discharging control module, wherein the charging control module is coupled to the charging or charging regulator unit for performing charging control of the charging or charging regulator unit;

wherein the discharging control module is coupled to the discharging or discharging regulator unit for performing discharging control of the discharging or discharging regulator unit such that the discharging or discharging regulator unit coupled to the electrical energy storage unit is configured to selectively transmit discharge power to the at least one AC output port and/or the at least one DC output port;

wherein a ratio between a voltage of the electrical energy storage unit and a voltage of the alternating current outputted by the adaptor ranges from 0.07 to 1.5;

wherein a ratio between the voltage of the electrical energy storage unit and a voltage of the direct current outputted by the adaptor ranges from 0.5 to 32;

wherein a ratio between a total power outputted by the power station and a total weight of the power station ranges from 20 Wh/kg to 75 Wh/kg;

wherein the housing comprising a top wall, a bottom wall and opposite side walls located between the top wall and the bottom wall, the power station comprises two handles attached to the housing, the two handles is configured to extend between the opposite side walls of the housing and respectively located at two sides of the top wall such that the power station becomes a portable device for a user to carry the total weight of the power station by the two handles, and wherein the protecting frame comprises a top seat, a bottom seat, and supporting columns respectively connected between the top seat and the bottom seat and disposed proximate a first side portion of the housing and a second side portion of the housing, the protecting frame defining a central plane, and the supporting columns arranged symmetrically with respect to the central plane.

2. The power station of claim 1, wherein the electrical energy storage unit comprises at least one battery pack, being originally used as a power source of a hand-held electric power tool or a garden tool, removably coupled to the power station.

3. The power station of claim 1, wherein the electrical energy storage unit comprises at least one battery pack, and the power station comprises a battery pack interface configured to removably receive the at least one battery pack.

4. The power station of claim 3, wherein the at least one battery pack is originally used as a power source for a handheld electric power tool, a garden tool or a vehicle.

5. The power station of claim 1, wherein the electrical energy input interface comprises at least one electrical connection terminal for forming an electrical connection with the electrical energy storage unit; the discharging or discharging regulator unit further comprises an inverter for converting a direct current outputted by the electrical energy storage unit into an alternating current, and the inverter is connected between the electrical energy input interface and the at least one AC output port.

6. The power station of claim 1, the protecting frame comprising a bottom seat at the bottom of the housing, a top seat at the top of the housing, supporting columns respectively connected between the bottom seat and the top seat, and a damping unit comprising one or more elastic elements received in at least one of the supporting columns.

7. A power station, comprising a housing, an electrical energy input interface, an electrical energy storage unit, an electrical energy output port unit, a charging or charging regulator unit, a discharging or discharging regulator unit and a control or control circuit unit, wherein the electrical energy input interface is configured to receive electrical energy from a power supply device;

the charging or charging regulator unit is configured to couple the electrical energy input interface to the electrical energy storage unit and to charge the electrical energy storage unit with electrical energy received from the electrical energy input interface;

the discharging or discharging regulator unit is configured to couple the electrical energy storage unit to the electrical energy output port unit and selectively transmit the electrical energy supplied by the electrical energy storage unit to the electrical energy output port unit;

the control or control circuit unit comprises a charging control module and a discharging control module, wherein the charging control module is coupled to the charging or charging regulator unit for performing charging control of the charging or charging regulator unit;

the discharging control module is coupled to the discharging or discharging regulator unit for performing discharging control of the discharging or discharging regulator unit so that the discharging or discharging regulator unit coupled to the electrical energy storage unit is configured to selectively transmit discharge power to the electrical energy output port unit, wherein the electrical energy output port unit at least comprises a first DC output port and/or a second AC output port;

wherein a ratio between a voltage of the electrical energy storage unit and a voltage of a direct current outputted by the first DC output port ranges from 0.5 to 32;

wherein a ratio between a voltage of the electrical energy storage unit and a voltage of an alternating current outputted by the second AC output port ranges from 0.07 to 1.5;

wherein the housing comprising a top wall, a bottom wall and opposite side walls located between the top wall and the bottom wall, the power station comprises two handles attached to the housing, the two handles is configured to extend between the opposite side walls of the housing and respectively located at two sides of the top wall such that the power station becomes a portable device for a user to carry a total weight of the power station by the two handles, and wherein a plurality of connecting bars respectively connect the top wall and the bottom wall and are disposed on a first side of the opposite side walls and a second side of the opposite side wall, and the housing defines a central plane, and the connecting bars are arranged symmetrically with respect to the central plane.

8. The power station of claim 7, wherein the electrical energy storage unit comprises at least one battery pack removably coupled to the power station.

9. The power station of claim 8, wherein the at least one battery pack is originally used as a power source of a hand-held electric power tool, a garden tool or a vehicle.

10. The power station of claim 7, wherein the electrical energy storage unit comprises at least one battery pack, and the power station comprises a battery pack interface configured to removably receive the at least one battery pack.

11. The power station of claim 7, wherein the electrical energy storage unit comprises at least one battery pack, and a ratio between a voltage of the at least one battery pack and a voltage of an alternating current outputted by the power station ranges from 0.07 to 1.5.

12. The power station of claim 7, wherein the electrical energy storage unit comprises at least one battery pack, and a ratio between a voltage of the at least one battery pack and a voltage of a direct current outputted by the power station ranges from 0.5 to 32.

13. The power station of claim 10, wherein the two handles are located at two sides of the battery pack interface so that the at least one battery pack is located between the two handles when the at least one battery pack is coupled to the battery pack interface.

14. The power station of claim 10, wherein the battery pack interface comprises one or more electrical connection terminals for forming an electrical connection with the at least one battery pack; the discharging or discharging regulator unit further comprises an inverter for changing a direct current outputted by the at least one battery pack into an alternating current, and the inverter is connected between the battery pack interface and the electrical energy output port unit.

15. The power station of claim 7, wherein the power station comprises a protecting frame, the protecting frame comprising a bottom seat at the bottom of the housing, a top seat at the top of the housing, supporting columns respectively connected between the bottom seat and the top seat, and a damping unit comprising one or more elastic elements received in at least one of the supporting columns.

16. A power system with a power station, the power station comprising a housing, an electrical energy input interface, an electrical energy storage unit, an electrical energy output port unit, a charging or charging regulator unit, a discharging or discharging regulator unit and a control or control circuit unit, wherein
the electrical energy input interface is configured to receive an electrical energy from a power supply device;
the charging or charging regulator unit is configured to couple the electrical energy input interface to the electrical energy storage unit and to charge the electrical energy storage unit with the electrical energy received from the electrical energy input interface;
the discharging or discharging regulator unit is configured to couple the electrical energy storage unit to the electrical energy output port unit and configured to receive electrical energy from the electrical energy storage unit and selectively transmit the electrical energy storage unit to the electrical energy output port unit;
the control or control circuit unit comprises a charging control module and a discharging control module, wherein
the charging control module is coupled to the charging or charging regulator unit for performing charging control of the charging or charging regulator unit; wherein
the discharging control module is coupled to the discharging or discharging regulator unit for performing discharging control of the discharging or discharging regulator unit so that the discharging or discharging regulator unit coupled to the electrical energy storage unit is configured to selectively transmit discharge power to the electrical energy output port unit;
wherein a ratio between a total power outputted by the power station and a total weight of the power station ranges from 20 Wh/kg to 75 Wh/kg;
wherein the housing comprising a top wall, a bottom wall and opposite side walls located between the top wall and the bottom wall, the power station comprises two handles attached to the housing, the two handles is configured to extend between the opposite side walls of the housing and respectively located at two sides of the top wall such that the power station becomes a portable device for a user to carry the total weight of the power station by the two handles, and
wherein a plurality of connecting bars respectively connect the top wall and the bottom wall and are disposed on a first side of the opposite side walls and a second side of the opposite side wall, and the housing defines a central plane, and the connecting bars are arranged symmetrically with respect to the central plane.

17. The power system of claim 16, wherein the electrical energy storage unit comprises at least one battery pack, being originally used as a power source of a hand-held electric power tool, a garden tool or a vehicle, and the at least one battery pack is removably coupled to the power station.

18. The power system of claim 16, wherein the electrical energy storage unit comprises at least one battery pack, and the power station comprises a battery pack interface configured to removably receive the at least one battery pack.

19. The power system of claim 18, wherein the battery pack interface comprises one or more connection terminals for forming an electrical connection with the at least one battery pack; the discharging or discharging regulator unit further comprises an inverter for converting a direct current outputted by the at least one battery pack into an alternating current, and the inverter is connected between the battery pack interface and the electrical energy output port unit.

20. The power system of claim 16, wherein the power station comprises a protecting frame, the protecting frame comprising a bottom seat at the bottom of the housing, a top seat at the top of the housing, supporting columns respectively connected between the bottom seat and the top seat, and a damping unit comprising one or more elastic elements received in at least one of the supporting columns.

* * * * *